(12) United States Patent
Morita et al.

(10) Patent No.: US 10,589,232 B2
(45) Date of Patent: Mar. 17, 2020

(54) FORWARD OSMOSIS MEMBRANE AND FORWARD OSMOSIS TREATMENT SYSTEM

(71) Applicants: ASAHI KASEI KABUSHIKI KAISHA, Tokyo (JP); NATIONAL UNIVERSITY CORPORATION KOBE UNIVERSITY, Kobe-shi, Hyogo (JP)

(72) Inventors: Toru Morita, Tokyo (JP); Masayuki Kaneda, Tokyo (JP); Masahiro Yasukawa, Kobe (JP); Hideto Matsuyama, Kobe (JP)

(73) Assignees: ASAHI KASEI KABUSHIKI KAISHA, Tokyo (JP); NATIONAL UNIVERSITY CORPORATION KOBE UNIVERSITY, Hyogo (JP)

(*) Notice: Subject to any disclaimer, the term of this patent is extended or adjusted under 35 U.S.C. 154(b) by 0 days.

(21) Appl. No.: 15/500,838

(22) PCT Filed: Aug. 10, 2015

(86) PCT No.: PCT/JP2015/072695
§ 371 (c)(1),
(2) Date: Jan. 31, 2017

(87) PCT Pub. No.: WO2016/024573
PCT Pub. Date: Feb. 18, 2016

(65) Prior Publication Data
US 2017/0225131 A1 Aug. 10, 2017

(30) Foreign Application Priority Data

Aug. 13, 2014 (JP) .................................. 2014-164742
Jan. 19, 2015 (JP) .................................. 2015-007755

(51) Int. Cl.
*B01D 71/56* (2006.01)
*B01D 69/02* (2006.01)
(Continued)

(52) U.S. Cl.
CPC ............. *B01D 71/56* (2013.01); *B01D 69/02* (2013.01); *B01D 69/10* (2013.01); *B01D 69/105* (2013.01);
(Continued)

(58) Field of Classification Search
None
See application file for complete search history.

(56) References Cited

U.S. PATENT DOCUMENTS 5,693,227 A * 12/1997 Costa .................. B01D 69/125
210/490
2011/0266223 A1 11/2011 Yang et al.
(Continued)

FOREIGN PATENT DOCUMENTS

EP  0 368 003 A2  5/1990
EP  0 407 684 A1  1/1991
(Continued)

OTHER PUBLICATIONS

Supplementary European Search Report and Annnex to the European Search Report in Application No. 15 83 1683, dated May 15, 2017 (5 pages).
(Continued)

*Primary Examiner* — Krishnan S Menon
(74) *Attorney, Agent, or Firm* — Finnegan, Henderson, Farabow, Garrett & Dunner, L.L.P.

(57) ABSTRACT

A forward osmosis membrane characterized in that a thin membrane layer having the performance of a semi-permeable membrane is laminated on a polyketone support layer.

15 Claims, 3 Drawing Sheets

(51) Int. Cl.

| | | |
|---|---|---|
| *B01D 69/10* | (2006.01) | |
| *B01D 69/12* | (2006.01) | |
| *B01D 71/44* | (2006.01) | |
| *B01D 71/38* | (2006.01) | |
| *B01D 63/02* | (2006.01) | |
| *B01D 71/62* | (2006.01) | |
| *B01D 63/08* | (2006.01) | |
| *B01D 71/64* | (2006.01) | |
| *B01D 71/16* | (2006.01) | |
| *B01D 61/00* | (2006.01) | |
| *B01D 71/68* | (2006.01) | |

(52) U.S. Cl.
CPC ........... *B01D 69/12* (2013.01); *B01D 69/125* (2013.01); *B01D 71/38* (2013.01); *B01D 71/44* (2013.01); *B01D 61/002* (2013.01); *B01D 63/02* (2013.01); *B01D 63/08* (2013.01); *B01D 71/16* (2013.01); *B01D 71/62* (2013.01); *B01D 71/64* (2013.01); *B01D 71/68* (2013.01); *B01D 2325/30* (2013.01)

(56) References Cited

U.S. PATENT DOCUMENTS

| | | |
|---|---|---|
| 2012/0043274 A1 | 2/2012 | Chi et al. |
| 2012/0318729 A1 | 12/2012 | Yip et al. |
| 2014/0110328 A1 | 4/2014 | Doi et al. |
| 2014/0217013 A1 | 8/2014 | Sato et al. |
| 2016/0121533 A1* | 5/2016 | Zhang .................... B01D 69/08 210/500.23 |

FOREIGN PATENT DOCUMENTS

| | | |
|---|---|---|
| JP | 2005-144412 | 6/2005 |
| JP | 2012-519593 | 8/2012 |
| JP | 2013-13888 | 1/2013 |
| JP | 2013-502323 | 1/2013 |
| JP | 2014-39915 | 3/2014 |
| KR | 10-2013-0142803 | 12/2013 |
| WO | WO 2011/028541 A2 | 3/2011 |
| WO | WO 2013/035747 A1 | 3/2013 |

OTHER PUBLICATIONS

Han, G., et al., "Thin-film composite forward osmosis membranes with novel hydrophilic supports for desalination", Journal of Membrane Science, vol. 423-424, pp. 543-555, (2012).
Wang, R., et al., "Characterization of novel forward osmosis hollow fiber membranes", Journal of Membrane Science, vol. 355, pp. 158-167, (2010).
International Search Report issued by the Japanese Patent Office in International Application No. PCT/JP2015/072696, dated Nov. 10 2015 (3 pages).
Notification of Transmittal of Translation of the International Preliminary Report on Patentability and IPRP issued by the International Bureau of WIPO in International Application No. PCT/JP2015/072695, dated Feb. 23, 2017 (2 pages).
Written Opinion of the International Searching Authority issued from the International Searching Authority in International Application No. PCT/JP2015/072695, dated Nov. 10, 2015 (5 pages).
Ge, Qingchun et al., "Draw Solutions for Forward Osmosis Processes: Developments, Challenges, and Prospects for the Future," Journal of Membrane Science, 442 (2013) 225-237.
Office Action for corresponding EP Application No. 15 831 883.2 dated Jul. 7, 2017.

\* cited by examiner

FORWARD OSMOSIS MEMBRANE AND FORWARD OSMOSIS TREATMENT SYSTEM

TECHNICAL FIELD

The present invention relates to a membrane and system to be used for forward osmosis treatment in which osmotic pressure difference is the driving force for movement of water from a dilute solution to a concentrated solution.

BACKGROUND ART

Forward osmosis treatment is a type of treatment in which solutions with different solute concentrations are contacted through a semi-permeable membrane, and the difference in osmotic pressure created by the difference in solute concentrations is used as the driving force to cause water to permeate through the semi-permeable membrane, thus causing migration of water from the dilute solution with low solute concentration to the concentrated solution with high solute concentration. Forward osmosis treatment allows concentration of dilute solutions, or dilution of concentrated solutions.

Forward osmosis treatment is similar to reverse osmosis treatment in that water is caused to permeate preferentially over solutes using a semi-permeable membrane. However, forward osmosis treatment utilizes the difference in osmotic pressure to cause migration of water from the dilute solution side to the concentrated solution side, and in this regard it differs from reverse osmosis treatment whereby pressure is applied to the concentrated solution side to cause migration of water against the difference in osmotic pressure, from the concentrated solution side to the dilute solution side. A semi-permeable membrane used for reverse osmosis treatment, therefore, is not necessarily suited for forward osmosis treatment if directly applied for forward osmosis treatment.

In reverse osmosis treatment, a concentrated solution is disposed on one side of a semi-permeable membrane while a dilute solution is disposed on the other side, and pressure at or greater than the difference in osmotic pressure of both solutions is applied to the concentrated solution to cause migration of water from the concentrated solution side to the dilute solution side. Therefore, a membrane used for reverse osmosis treatment (a reverse osmosis membrane) must have strength able to withstand the pressure at the concentrated solution side. In order to satisfy this requirement, it is necessary to ensure strength for the support layer that reinforces the thin membrane layer that exhibits semi-permeable membrane performance (also known as the skin layer or barrier material). The porosity of the support layer therefore cannot be increased to any very high extent. This consequently limits the space in which the solute in the support layer can freely diffuse. In reverse osmosis treatment, however, the direction of water permeation is the same as the leakage direction of the solute (salt), and therefore interior concentration polarization of the solute in the support layer does not take place. Consequently, the structure of the support layer has no definitive effect on the amount of water permeation through the membrane (also known as the membrane flux). In reverse osmosis treatment, therefore, as the pressure applied at the concentrated solution side increases, it is possible to also increase the amount of water permeating the semi-permeable membrane and migrating (the water permeation volume).

In forward osmosis treatment, on the other hand, the interior concentration polarization of the solute in the support layer has a major effect on the water permeation volume of the membrane. In forward osmosis treatment, a concentrated solution is situated on one side sandwiching the membrane (forward osmosis membrane), while a dilute solution is situated on the other side, and the difference in osmotic pressure between the two solutions is used as the driving force to cause migration of water from the dilute solution side to the concentrated solution side. In order to increase the water permeation volume of the forward osmosis membrane during this time, it is important to maximally reduce the interior concentration polarization of the solute in the support layer reinforcing the thin membrane layer which exhibits the semi-permeable membrane performance, to increase the effective osmotic pressure difference of the thin membrane layer. If the space in which the solute can freely diffuse in the support layer is limited, interior concentration polarization of the solute in the support layer will take place, making it impossible to ensure adequate water permeation volume. In a forward osmosis membrane, therefore, it is important to compose the support layer of a material that has a high enough porosity to avoid restricting interior diffusion of the solute as much as possible, and that is able to ensure the prescribed strength.

Various semi-permeable membranes have previously been investigated as forward osmosis membranes. For example, PTL 1 discloses a forward osmosis membrane having a thin membrane layer made of polyamide laminated on a support layer made of polyacrylonitrile, polyacrylonitrile-vinyl acetate copolymer, or polysulfone;

PTL 2 discloses a forward osmosis membrane having a thin membrane layer made of polyamide laminated on a support layer made of an epoxy resin; and PTL 3 discloses a forward osmosis membrane having a barrier material coated on a support layer made of polyethylene terephthalate (PET) or polypropylene.

However, forward osmosis membranes with both high water permeability and high separation performance have not yet been obtained, and forward osmosis membranes with higher performance are desired.

Incidentally, forward osmosis treatment is usually carried out using a module comprising a forward osmosis membrane made into an appropriate form, packed into an appropriate container. Since a module using a forward osmosis membrane with a hollow fiber form can increase the fill factor of the membrane per module compared to a module using a forward osmosis membrane with a flat membrane form, it is considered more suitable in that it allows construction of a compact water purification system (NPL 1).

Macromolecular forward osmosis membranes using high molecular weight materials as the thin membrane layers are advantageous in terms of water permeability, and are therefore promising for application to forward osmosis membranes. However, the conventionally known macromolecular forward osmosis membranes are problematic in terms of durability against acids and organic solvents, as well as heat resistance, and are therefore limited in their scope of use.

In this regard, PTL 4 has proposed a forward osmosis membrane flow system that improves durability while maintaining the water permeability advantage of the macromolecular forward osmosis membranes, by using a forward osmosis membrane containing the inorganic material zeolite. However, although the forward osmosis membrane described in PTL 4 has improved durability, the water permeation volume is extremely low, and it has problems in terms of practicality as a forward osmosis membrane flow system.

CITATION LIST

Patent Literature

[PTL 1] Japanese Patent Public Inspection No. 2012-519593
[PTL 2] Japanese Unexamined Patent Publication No. 2013-013888
[PTL 3] Japanese Patent Public Inspection No. 2013-502323
[PTL 4] Japanese Unexamined Patent Publication No. 2014-039915

Non-Patent Literature

[NPL 1] J. Membr. Sci., 355(2010), pp 158-167

DISCLOSURE OF THE INVENTION

Problems to be Solved by the Invention

The present invention has been accomplished in light of the circumstances described above. It is therefore an object of the invention to provide a forward osmosis membrane with a novel flat membrane form or hollow fiber form, having high water permeation volume for forward osmosis treatment. It is another object of the invention to provide a forward osmosis treatment system having sufficient durability against organic compounds, and excellent permeability for water.

Means for Solving the Problems

The present inventors have pursued active research with the goal of eliminating the problems mentioned above. As a result it was found that a forward osmosis membrane with high water permeation volume, and having effectively reduced interior concentration polarization of solute at the support layer, can be obtained by using a polyketone porous membrane with a flat membrane form (flat form) or hollow fiber form as the support layer for the forward osmosis membrane, and layering a thin membrane layer exhibiting semi-permeable membrane performance:

on either the front side or the back side, in the case of a flat membrane form; or on either the inner surface or outer surface, in the case of a hollow fiber form. The forward osmosis membrane has high durability against organic compounds, and can maintain high water permeation volume even with repeated use as a forward osmosis treatment system. The present invention is as follows.

(1) A forward osmosis membrane wherein a thin membrane layer exhibiting semi-permeable membrane performance is laminated on a polyketone support layer.

(2) A forward osmosis membrane according to (1), wherein the thin membrane layer exhibiting semi-permeable membrane performance is a thin membrane layer made of cellulose acetate, polyamide, a polyvinyl alcohol/polypiperazineamide composite membrane, sulfonated polyethersulfone, polypiperazineamide or polyimide.

(3) A forward osmosis membrane according to (1) or (2), wherein the thin membrane layer exhibiting semi-permeable membrane performance is a polyamide thin membrane layer with a thickness of 0.05 to 2 µm.

(4) A forward osmosis membrane according to (3), wherein the polyamide thin membrane layer is bonded to the polyketone support layer.

(5) A forward osmosis membrane according to (4), wherein the polyamide thin membrane layer is bonded to the polyketone support layer by interfacial polymerization.

(6) A forward osmosis membrane according to any one of (1) to (5), wherein the polyketone support layer has pores with a maximum pore size of 50 nm or greater as measured by the bubble point method.

(7) A forward osmosis membrane according to any one of (1) to (6), wherein the porosity of the polyketone support layer is 70% or greater.

(8) A forward osmosis membrane according to any one of (1) to (7), wherein the polyketone support layer has a flat form.

(9) A forward osmosis membrane according to any one of (1) to (7), wherein the polyketone support layer has a hollow fiber form.

(10) A forward osmosis membrane according to (9), wherein the thin membrane layer exhibiting semi-permeable membrane performance is laminated on either the outer side surface or inner side surface of the hollow fiber polyketone support layer.

(11) A forward osmosis membrane according to (9) or (10), wherein the hollow fiber polyketone support layer has an outer diameter of 100 to 3,000 µm and a thickness of 10 to 400 µm.

(12) A forward osmosis hollow fiber membrane module, which has a structure in which a fiber bundle comprising a plurality of forward osmosis membranes according to any one of (9) to (11) is housed in a tubular case, and both ends of the fiber bundle are anchored to the tubular case by adhesively anchored sections.

(13) A forward osmosis treatment system comprising:
a semi-permeable membrane unit made of a forward osmosis membrane according to any one of (1) to (11),
a first region and a second region mutually partitioned via the semi-permeable membrane unit,
a hyposmotic solution feeder that feeds a hyposmotic solution to the first region, and
a hyperosmotic solution feeder that feeds a hyperosmotic solution to the second region,
and having a function of producing fluid movement from the first region to which the hyposmotic solution has been fed to the second region to which the hyperosmotic solution has been fed, through the semi-permeable membrane unit.

(14) A forward osmosis treatment system according to (13), wherein either or both the hyposmotic solution and the hyperosmotic solution include an organic compound.

(15) A water production method wherein a forward osmosis treatment system according to (13) or (14) is used to cause water to migrate from a hyposmotic solution to a hyperosmotic solution, and then the water is recovered from the hyperosmotic solution.

(16) A method of concentrating a water-containing substance, wherein a forward osmosis treatment system according to (13) or (14) is used to remove water from a water-containing substance.

(17) A method of diluting a solution, wherein a forward osmosis treatment system according to (13) or (14) is used to dilute a hyperosmotic solution by water migrating from a hyposmotic solution to the hyperosmotic solution.

(18) An electric power generation method, wherein a forward osmosis treatment system according to (13) or (14) is used to cause water to migrate from a hyposmotic solution to a hyperosmotic solution to increase the flow rate of the hyperosmotic solution, and the increased flow rate drives a water flow electric generator to generate electricity.

Effect of the Invention

The forward osmosis membrane of the invention:
has minimized interior concentration polarization of solute in the support layer,
has effectively increased water permeation volume,
maintains a low level of back diffusion of solute from the concentrated solution side, and
has high durability against hyposmotic fluid containing organic compounds. Therefore, a forward osmosis treatment system obtained by applying the forward osmosis membrane of the invention can stably exhibit high performance for prolonged periods.

The forward osmosis treatment system of the invention can be suitably used, for example, in desalination of seawater, desalting of salt water, waste water treatment, concentration of valuable substances, treatment of accessory water used in oil/gas excavation, electric power generation utilizing two solutions with different osmotic pressures, and dilution of saccharides, fertilizers or refrigerants.

BEST MODE FOR CARRYING OUT THE INVENTION

Figure 1:
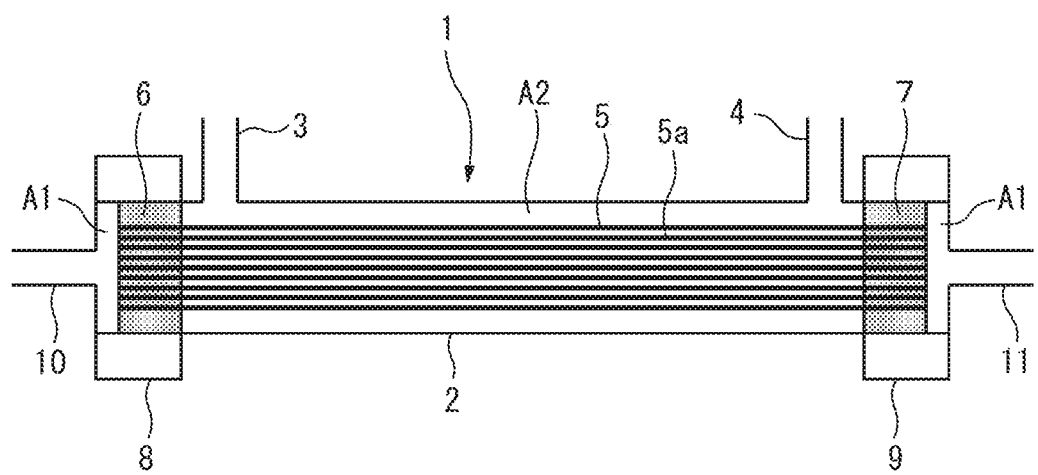
FIG. 1 is a cross-sectional view schematically showing a construction example of a hollow fiber membrane module to be used in the forward osmosis treatment system of the invention.

The forward osmosis membrane of the invention has a construction with a thin membrane layer exhibiting semi-permeable membrane performance laminated on a polyketone support layer.

<Polyketone Support Layer>

The polyketone support layer composing the forward osmosis membrane of the invention will be explained first.

The polyketone composing the support layer is made of a copolymer of carbon monoxide and an olefin.

If the support layer of the forward osmosis membrane is composed of a polyketone, the benefits of the following advantages can be provided.

Firstly, it is possible to form a support layer with a high porosity while ensuring strength.

Secondly, the polyketone support layer has a high self-supporting property. Since this eliminates the need for a support base such as a nonwoven fabric that has been required for conventional reverse osmosis membranes, the forward osmosis membrane can be made to an even smaller thickness.

Thirdly, polyketones are highly moldable. Since it is therefore possible to easily form a support layer having a desired form such as a flat or hollow fiber form, it can be easily applied for any desired membrane module having a shape known in the prior art.

The polyketone support layer preferably includes the polyketone, as a copolymer of carbon monoxide and one or more olefins, at between 10 mass % and 100 mass %, inclusive. A higher polyketone content is preferred for the polyketone support layer from the viewpoint of ensuring strength and forming a support layer with a high porosity. For example, the polyketone content of the polyketone support layer is preferably 70 mass % or greater, more preferably 80 mass % or greater, even more preferably 90 mass % or greater and most preferably 100 mass %. The polyketone content of the polyketone support layer can be confirmed by a method of dissolving out the polyketone with a solvent that dissolves only polyketones among the components of the support layer, or a method of dissolving out the components other than the polyketone with a solvent that dissolves components other than polyketones.

As the olefin to be copolymerized with carbon monoxide for synthesis of the polyketone there may be selected any desired compound suited for the purpose. Examples of olefins include linear olefins such as ethylene, propylene, butene, hexene, octene and decene;
alkenyl aromatic compounds such as styrene and α-methylstyrene;
cyclic olefins such as cyclopentene, norbornane, 5-methylnorbornane, tetracyclodecene, tricyclodecene, pentacyclopentadecene and pentacyclohexadecene;
alkene halides such as vinyl chloride and vinyl fluoride;
acrylic acid esters such as ethyl acrylate and methyl methacrylate; and
vinyl acetate. From the viewpoint of ensuring strength for the polyketone support layer, the number of types of olefins to be copolymerized is preferably 1 to 3, more preferably 1 to 2 and even more preferably 1.

The polyketone is preferably one having a repeating unit represented by the following formula (1).

$$—R—C(=O)— \qquad (1)$$

{In formula (1), R represents an optionally substituted divalent hydrocarbon group with 2 to 20 carbon atoms.}

Examples for the substituent R include halogens, hydroxyl groups, alkoxyl groups, primary amino groups, secondary amino groups, tertiary amino groups, quaternary ammonium groups, sulfonic acid groups, sulfonic acid ester groups, carboxylic acid groups, carboxylic acid ester groups and phosphate groups, phosphoric acid ester groups, thiol groups, sulfide groups, alkoxysilyl groups and silanol groups, and any one or more may be selected from among these.

In formula (1), the repeating unit of the polyketone (i.e. the ketone repeating unit) may consist of a single type or a combination of two or more types.

The number of carbon atoms of the hydrocarbon group R in formula (1) is more preferably 2 to 8, even more preferably 2 to 3 and most preferably 2. The repeating unit of the polyketone most preferably includes a high proportion of repeating units of 1-oxotrimethylene represented by the following formula (2).

$$—CH_2—CH_—C(=O)— \qquad (2)$$

From the viewpoint of ensuring strength for the polyketone support layer, the proportion of 1-oxotrimethylene repeating units among the repeating units of the polyketone is preferably 70 mol % or greater, more preferably 90 mol % or greater and even more preferably 95 mol % or greater.

The proportion of 1-oxotrimethylene repeating units may even be 100 mol %. Here, "100 mol %" means that no repeating units are observed other than 1-oxotrimethylene, except for polymer end groups, in a known analysis method such as elemental analysis, NMR (nuclear magnetic resonance) or gas chromatography. The structures of repeating units of the polyketone and the amount of each structure is typically confirmed by NMR.

The support layer composed of the polyketone is a porous structure, and solutes and water can pass through the support layer through interior penetrating voids. In order to effectively minimize interior concentration polarization of solutes in the support layer, it is preferred for pores with large pore sizes to be formed in the support layer. In this regard, the polyketone support layer preferably has pores formed with a maximum pore size of 50 nm or greater. The maximum pore size is measured by the bubble point method (according to ASTM F316-86 or JIS K3832). When a polyketone porous membrane having pores with a maximum pore size of 50 nm as measured by the bubble point method is used as the support layer for the forward osmosis membrane, it is possible to reduce the interior concentration polarization of solutes in the support layer, and thus increase the performance of the forward osmosis membrane. Since the interior concentration polarization of solutes decreases as the maximum pore size increases, the maximum pore size of the polyketone support layer is more preferably 80 nm or greater and even more preferably 130 nm or greater. On the other hand, the active layer becomes difficult to support as the maximum pore size increases, potentially leading to poor pressure resistance. From this viewpoint, the maximum pore size of the polyketone support layer is preferably no greater than 2 μm, more preferably no greater than 1.5 μm, even more preferably no greater than 1 μm and most preferably no greater than 0.6 μm.

There is no particular restriction on the porosity of the polyketone support layer. However, diffusion of solutes in the support layer tends to occur with a higher porosity, and the interior concentration polarization of solutes in the support layer is reduced, allowing the water permeation volume of the forward osmosis membrane to be increased. An excessively high porosity, on the other hand, will impair the pressure resistance. From this viewpoint, the porosity of the polyketone support layer is preferably 60% to 95%, more preferably 70% to 95% and even more preferably 80% to 95%.

The porosity of the polyketone support layer (porous membrane) is calculated by the following mathematical formula (3).

$$\text{Porosity (\%)} = (1 - G/\rho/V) \times 100 \quad (3)$$

{In formula (3), G is the mass (g) of the polyketone support layer, ρ is the mass-average density (g/cm³) of all of the resins composing the polyketone support layer, and V is the volume (cm³) of the polyketone support layer.}

When the polyketone support layer is composed of a complex of a polyketone resin and a resin with a different density than the polyketone, the mass-average density ρ in mathematical formula (3) is the sum of the products of the densities of each resin multiplied by their respective constituent mass ratios. For example, for a nonwoven fabric containing fibers having densities ρA and ρB at mass ratios GA and GB, respectively, when a polyketone of density ρp is combined in a mass ratio of Gp, the mass-average density ρ is represented by the following mathematical formula (4).

$$\text{Mass-average density } \rho = (\rho A \cdot GA + \rho B \cdot GB + \rho p \cdot Gp)/(GA + GB + Gp) \quad (4)$$

The porous membrane composing the polyketone support layer may be a symmetrical membrane or an asymmetrical membrane. When the polyketone porous membrane is an asymmetrical membrane, the thin membrane layer exhibiting semi-permeable membrane performance is preferably provided on the denser side of the polyketone porous membrane.

The form of the polyketone support layer of the invention is not particularly restricted, but it is preferably a flat membrane form (flat form) or hollow fiber form for easier application to conventionally known membrane modules.

[Flat Membrane Polyketone Support Layer]

When the polyketone support layer is a flat membrane form, the polyketone support layer is preferably formed as thin as possible while ensuring strength, from the viewpoint of minimizing interior concentration polarization of solutes in the support layer. The thickness of the polyketone support layer is preferably no greater than 300 μm and more preferably no greater than 200 μm, for example. Form the viewpoint of easier fabrication, on the other hand, the polyketone support layer must have at least a minimum degree of thickness. The thickness of the polyketone support layer is preferably 9 μm or greater and more preferably 14 μm or greater. The thickness of the polyketone support layer can be measured by observing a cross-section thereof by SEM.

From the viewpoint of ensuring pressure resistance of the forward osmosis membrane, the pressure resistance of the polyketone support layer is preferably 0.1 MPa or greater and more preferably 0.2 MPa or greater. For a forward osmosis membrane in which a polyamide thin membrane layer is laminated on a polyketone support layer, the pressure resistance is the maximum pressure at which the membrane does not rupture in a pressurized water permeation test in which water or low concentration brine is used to apply water pressure in a range of 0 to 2 MPa.

From the viewpoint of further increasing the pressure resistance of the forward osmosis membrane, the nonwoven fabric may be used as a reinforcing material in combination with the polyketone support layer. In this case, the porosity of the nonwoven fabric is preferably 60% or greater, more preferably 70% or greater and even more preferably 80% or greater in order to avoid impairing the water permeability of the obtained support layer.

[Hollow Fiber Polyketone Support Layer]

When the polyketone support layer has a hollow fiber form (fiber form), the polyketone support layer is a membrane with voids running through the interior in the fiber axis direction. The outer diameter of the polyketone hollow fiber membrane will differ depending on the purpose of use, but a range of 50 to 5,000 μm is suitable. Considering the volume of the device per membrane unit area when made into a hollow fiber membrane module, a smaller (narrower) outer diameter of the polyketone hollow fiber membrane is preferred. On the other hand, a certain minimum outer diameter and inner diameter are desirable in consideration of the throughput capacity per unit time of the hollow fiber membrane module. Considering both of these factors, a more preferred range for the outer diameter of the polyketone hollow fiber membrane is 100 to 3,000 μm, and an even more preferred range is 200 to 1,500 μm.

From the viewpoint of minimizing interior concentration polarization of solutes in the support layer, the thickness of the polyketone hollow fiber membrane (at the membrane section) is preferably as thin as possible while ensuring strength. From the viewpoint of easier fabrication, on the other hand, the membrane section of the polyketone hollow fiber must have at least a minimum degree of thickness. An appropriate range for the thickness of the membrane section of the polyketone hollow fiber membrane is preferably 10 to 400 μm and more preferably 15 to 200 μm. The thickness of the membrane section of the polyketone hollow fiber membrane can be measured by observing a cross-section thereof by SEM. The cross-section of the polyketone hollow fiber membrane may have any appropriate shape such as circular, elliptical or polygonal, but a circular shape is most preferred for symmetry.

The cross-sectional structure of the membrane section of the polyketone hollow fiber membrane may be as a symmetrical membrane having a uniform pore structure from the outside to the inside, or it may be as an asymmetrical membrane having a different pore structure in the outside and inside. When the polyketone hollow fiber membrane is an asymmetrical membrane, the thin membrane layer exhibiting semi-permeable membrane performance is preferably provided on the denser side of the polyketone porous membrane.

[Method for Producing Polyketone Support Layer]

The polyketone support layer can be produced by a known method. For example, a polyketone may be dissolved in a solution containing a metal halide (for example, a zinc halide or alkali metal halide) to prepare a polyketone dope, and the dope passed through a film die, double tube orifice or the like and discharged into a coagulating bath for formation into a film, hollow fiber or other form, and further rinsed and dried to obtain a polyketone porous membrane. The porosity and pore size of the polyketone porous membrane can be varied by adjusting the polymer concentration in the dope and the temperature of the coagulating bath, for example, during the procedure.

As a different method, the polyketone may be dissolved in a good solvent (for example, resorcinol, hexafluoroisopropanol, m-cresol or o-chlorphenol), and the obtained solution cast onto a substrate and dipped in a non-solvent (for example, methanol, isopropanol, acetone or water), and rinsed and dried to obtain a polyketone porous membrane. In this case, the mixing ratio of the polyketone and good solvent and the type of non-solvent, for example, may be adjusted as appropriate to change the porosity and pore size of the polyketone porous membrane.

The polyketone can be obtained, for example, by polymerization of carbon monoxide and an olefin using a catalyst such as palladium or nickel. Production of the polyketone support layer can be carried out with reference to Japanese Unexamined Patent Publication No. 2002-348401 or Japanese Unexamined Patent Publication HEI No. 2-4431, for example.

<Thin Membrane Layer Exhibiting Semi-Permeable Membrane Performance>

A thin membrane layer exhibiting semi-permeable membrane performance is formed on the polyketone support layer. The thin membrane layer may be formed from a known material conventionally used for forward osmosis membranes or reverse osmosis membranes. The thin membrane layer may be any layer made of a material having the ability to cause water to permeate and migrate from the dilute solution side to the concentrated solution side, utilizing difference in osmotic pressure. The semi-permeable membrane used may be a semi-permeable membrane that is commonly used in reverse osmosis (RO) membranes, or nanofilters (NF). Examples of such semi-permeable membranes that are suitable for use include cellulose acetate, polyamide, polyvinyl alcohol/polypiperazineamide composite membranes, sulfonated polyethersulfone, polypiperazineamide and polyimide. The semi-permeable membrane may be selected as appropriate in consideration of durability against hyposmotic solutions and hyperosmotic solutions. Polyvinyl alcohol/polypiperazineamide composite membranes are described in Desalination, Vol. 257(No. 1-3), pp 129-136, for example.

Thin membrane layers made of polyamide are particularly suitable for use because they facilitate formation of thin membranes on polyketone membranes. The polyamide thin membrane layer is preferably one obtained by polymerization of a polyamine and a polycarboxylic acid derivative. In this case, preferably the amino group of the polyamine and the carbonyl group of the polycarboxylic acid derivative undergo condensation to form an amide group.

A polyamine is a compound having two or more amino groups in the molecule. Examples of such polyamines include aliphatic polyamines such as ethylenediamine, tris (2-aminoethyl)amine, bis(hexamethylene)triamine and diaminocyclohexane, and aromatic polyamines such as phenylenediarnine, triaminobenzene and diaminotoluene. Aromatic polyamines are preferably used as polyamines. A single type of polyamine may be used, or two or more different ones may be used.

The polycarboxylic acid derivative is any compound having two or more acyl groups that can be condensed with the amino groups of a polyamine. Preferred are compounds having 3 or more acyl groups that can be condensed with amino groups. The carboxylic acid derivative may be used in the form of a free carboxylic acid, or in the form of an acid anhydride, or acid halide. From the viewpoint of reactivity with the polyamine, the polycarboxylic acid derivative used is preferably a polycarboxylic acid halide (acid halide). Examples of polycarboxylic acid halides include polycarboxylic acid fluorides, polycarboxylic acid chlorides, polycarboxylic acid bromides and polycarboxylic acid iodides. In consideration of ready availability and reactivity with amino groups, it is preferred to use a polycarboxylic acid chloride.

Examples of polycarboxylic acid halides include aliphatic polycarboxylic acid halides such as propanedicarboxylic acid dichloride, butanedicarboxylic acid dichloride, pentanedicarboxylic acid dichloride, propanetricarboxylic acid trichloride, cyclohexanedicarboxylic acid dichloride and cyclohexanetricarboxylic acid trichloride; and aromatic polycarboxylic acid halides such as terephthalic acid dichloride, isophthalic acid dichloride, biphenyldicarboxylic acid dichloride, naphthalenedicarboxylic acid dichloride and trimesic acid trichloride. Aromatic polycarboxylic acid halides are preferred for use as polycarboxylic acid halides. A single type of polycarboxylic acid derivative (polycarboxylic acid halide) may be used, or two or more types may be used.

From the viewpoint of absolutely minimizing leakage of salt, the polyamide thin membrane layer is preferably bonded to the polyketone support layer. The bonding may be a state of chemical bonding or physical bonding. Chemical bonding may be covalent bonding. Covalent bonds include C—C bonds, C=N bonds and bonds via pyrrole rings. When the state is physical bonding, it may be an adsorbed or adhered state bonded by intermolecular forces without chemical bonding, such as hydrogen bonding, Van der Waals forces, electrostatic attraction or hydrophobic interaction. The polyamine is preferably chemically bonded to the polyketone. The polyamide thin membrane layer is preferably composed of the polycondensation product of a first monomer comprising at least one monomer selected from among polyamines, and a second monomer comprising at least one monomer selected from the group consisting of polycarboxylic acid derivatives. Specifically, the polyamide thin membrane layer is preferably obtained by situating a polyamine on the polyketone support layer, further situating a polycarboxylic acid derivative thereover, and conducting interfacial polymerization between the polyamine and the polycarboxylic acid derivative.

[Method of Forming Thin Membrane Layer on Flat-Membrane Polyketone Support Layer]

When the polyketone support layer has a flat membrane form, the polyamide thin membrane layer can be formed on the polyketone support layer by, for example, coating the polyketone support layer with an aqueous solution of a polyamine, further coating this with a solution of a polycarboxylic acid derivative dissolved in an organic solvent (polycarboxylic acid derivative-containing solution), and conducting interfacial polymerization between the polyamine and the polycarboxylic acid derivative. The organic solvent that is to dissolve the polycarboxylic acid derivative is preferably one with low solubility for water, and for example, hydrocarbon-based solvents such as hexane, octane and cyclohexane may be used. By adjusting the concentration and coating amount of the polyamine aqueous solution and polycarboxylic acid derivative-containing solution, it is possible to change the pore size and thickness of the polyamide thin membrane layer and to adjust the separative power of the obtained forward osmosis membrane. Formation of the polyamide thin membrane layer can be accomplished with reference to Japanese Unexamined Patent Publication SHO No. 58-24303 or Japanese Unexamined Patent Publication HEI No. 1-180208, for example.

The polyamide thin membrane layer may be obtained by polymerization of a polyamine and a polycarboxylic acid derivative. Reaction of the polyamine with the carbonyl groups of the polyketone will allow chemical bonding of the polyamide thin membrane layer with the polyketone support layer. For example, when the polyamide thin membrane layer is to be formed by interfacial polymerization, the polyamide thin membrane layer may be chemically bonded to the polyketone support layer, thus allowing firm bonding to be formed between the polyamide thin membrane layer and polyketone support layer.

The time from coating of the polyamine aqueous solution and coating of the polycarboxylic acid derivative-containing solution on the polyketone support layer may be adjusted to, for example, about 10 seconds to 180 seconds. After the polyketone support layer has been coated with the polyamine aqueous solution and the polycarboxylic acid derivative-containing solution has been coated thereover to form a polyamide thin membrane layer, the excess polycarboxylic acid derivative-containing solution is preferably removed and annealing is performed. The annealing may be carried out by a known method. For example, the method may be by heat treatment, or a method of contacting with hot water followed by rinsing with a sodium hypochlorite aqueous solution. Annealing can increase the performance of the thin membrane layer. When annealing is performed by heating, it may be heating, for example, at a temperature in the range of 70° C. to 160° C. (preferably 80° C. to 130° C.) for 1 minute to 20 minutes (preferably 3 minutes to 15 minutes).

There are no particular restrictions on the thickness of the thin membrane layer, but it is preferably about 0.05 µm to 2 µm and more preferably 0.05 µm to 1 µm. The thickness of the thin membrane layer can be measured by observation of a cross-section of the forward osmosis membrane by SEM.

[Method of Forming Thin Membrane Layer on Hollow Fiber Polyketone Support Layer]

When the polyketone support layer has a hollow fiber form, the forward osmosis hollow fiber membrane of this embodiment preferably has a construction in which a thin membrane layer exhibiting semi-permeable membrane performance is laminated on either the outer side surface or inner side surface of the polyketone hollow fiber membrane. Having the thin membrane layer exhibiting semi-permeable membrane performance laminated on the outer surface is advantageous because the area of the thin membrane layer will be increased, allowing the water permeation volume per hollow fiber to be higher. When it is formed into a module, however, the thin membrane layer may become damaged or destroyed by friction between the hollow fibers that occurs during the course of processing or during use. When the thin membrane layer exhibiting semi-permeable membrane performance is laminated on the inner surface, the thin membrane layer is less likely to be damaged or destroyed by friction between the hollow fibers, but the area of the thin membrane layer is also reduced.

Layering of the thin membrane layer exhibiting semi-permeable membrane performance on the polyketone hollow fiber membrane can be accomplished utilizing a previously disclosed method. For example, coating methods or interfacial polymerization methods may be employed. When the thin membrane layer exhibiting semi-permeable membrane performance is a polyamide thin membrane layer, the thin membrane layer is preferably formed by an interfacial polymerization method.

When the polyamide thin membrane layer is to be laminated on the outside of the polyketone hollow fiber membrane, a method may be employed in which the hollow fibers are fed with a roll while passing them through a first monomer solution to adhere the first monomer solution onto the outsides of the hollow fibers, after which the excess solution is removed and they are then passed through a second monomer solution.

When the polyamide thin membrane layer is to be laminated onto the insides of the polyketone hollow fiber membranes, the preferred method is one in which the polyamide thin membrane layer is laminated after having fabricated the polyketone hollow fiber membrane module.

There are no particular restrictions on the method of fabricating the polyketone hollow fiber membrane module. As an example, first the hollow fiber membrane is cut to a prescribed length and bundled into the necessary number of fibers, and the bundle placed in a tubular case 2 as shown in FIG. 1, for example. Next, both ends of the case are temporarily capped, and a urethane-based or epoxy-based adhesive is set on both ends of the hollow fiber membrane. A method of setting the adhesive while rotating the module with a centrifuge is a preferred method as it allows the adhesive to be uniformly filled. After the adhesive has been solidified, the temporary caps are removed and both ends are again cut so that the hollow fiber membrane ends are open, thereby obtaining a hollow fiber membrane module.

The module obtained in this manner may be used in a method wherein a liquid conveyance pump is used to first supply the first monomer solution to the inside of the polyketone hollow fiber membrane in the module and adhere the first monomer solution onto the insides of the hollow fibers, and the excess first monomer solution is then removed, after which the second monomer solution is supplied in the same manner for reaction. The excess second monomer solution is then preferably removed and annealing is performed. The annealing may be carried out by a known method. For example, the method may be by heat treatment, or a method of contacting with hot water followed by rinsing with a sodium hypochlorite aqueous solution. Annealing can increase the performance of the thin membrane layer. When annealing is carried out by heating, it may be heating, for example, at a temperature in the range of 70° C. to 160° C. for 1 to 20 minutes.

<Forward Osmosis Membrane>

The forward osmosis membrane of the invention has a construction with a thin membrane layer exhibiting semi-permeable membrane performance laminated on a polyketone support layer.

By using a polyketone as the support layer, the forward osmosis membrane of the invention can ensure the support layer strength while increasing the porosity of the support layer or allowing the membrane thickness to be reduced. The performance of the support layer of a forward osmosis membrane can be indicated by a structural parameter S. The structural parameter S is calculated theoretically by: membrane thickness×curvature/porosity. The structural parameter S for a support layer is preferably a smaller value. That is, preferably the membrane thickness and curvature are low and the porosity is high. In particular, the curvature and porosity are closely related to the chemical structure of the support layer in most cases. According to the invention, using a polyketone will allow a support layer with a particularly small structural parameter S to be obtained.

The structural parameter S of the support layer in the forward osmosis membrane of the invention is preferably no greater than 400 μm. If the structural parameter S is too large, diffusion of solutes (salts) inside the support layer will be slowed. As a result, in the support layer, the interior concentration polarization of the solute will increase, the effective osmotic pressure difference will decrease, and the water permeation volume will be lowered. From the viewpoint of reducing the interior concentration polarization of solute in the support layer, therefore, the structural parameter S is preferably no greater than 400 μm and more preferably no greater than 300 μm. The structural parameter S is determined by the method described in the Examples.

A higher water permeation volume is preferred for the forward osmosis membrane. Specifically, the water permeation volume $J_W^{FO}$ is preferably 10 $Lm^{-2} h^{-1}$ or greater and more preferably 15 $Lm^{-2} h^{-1}$ or greater. If such a water permeation volume can be achieved, a larger flow rate will be obtained when forward osmosis treatment is conducted. The water permeation volume $J_W^{FO}$ is determined by the method described in the Examples.

The forward osmosis membrane of the invention also has the polyamide thin membrane layer uniformly laminated on the polyketone support layer due to high reactivity between the polyketone and amine and satisfactory affinity with the amine aqueous solution. Consequently, the forward osmosis membrane of the invention is a forward osmosis membrane with high salt rejectivity and satisfactory performance.

In the forward osmosis membrane of the invention, a fabric such as a woven fabric or nonwoven fabric; or a membrane, may be laminated on one or both sides of the forward osmosis membrane for the purpose of minimizing performance reduction due to adsorption of contaminants.

<Forward Osmosis Treatment System>

The forward osmosis treatment system of the invention utilizes the phenomenon of forward osmosis. In this forward osmosis treatment system, a hyposmotic solution is supplied to one side (first regions A1) of a semi-permeable membrane unit, and a hyperosmotic solution with higher osmotic pressure than the hyposmotic solution is supplied to the other side (second region A2). This produces fluid movement from the hyposmotic solution side to the hyperosmotic solution side. As a result it causes an increase in the flow rate on the hyperosmotic solution side.

The forward osmosis treatment system of the invention will now be described in greater detail with reference to the accompanying drawings.

FIG. 1 is a cross-sectional view schematically showing a construction example of a hollow fiber membrane module to be used in the forward osmosis treatment system of the invention. This embodiment will be explained as an example of using a hollow fiber form semi-permeable membrane as the semi-permeable membrane unit. However, the semi-permeable membrane unit is not limited to this construction, and instead a semi-permeable membrane with a flat form (flat membrane form), for example, may be used.

The hollow fiber membrane module 1 shown in FIG. 1 comprises a hollow fiber membrane bundle 5 made of a plurality of hollow fiber membranes (semi-permeable membrane units) 5a that are open at both ends, a tubular case 2 that houses the hollow fiber membrane bundle 5, and adhesive anchor layers 6 and 7 that adhesively anchor both ends of the hollow fiber membrane bundle 5 to the tubular case 2. The adhesive anchor layers 6 and 7 are partitioned into regions where the openings of the hollow fiber membrane 5a are exposed, and an outer region connected to those regions, around the hollow fiber membrane 5a. The example explained here is one in which both end sides of the hollow fiber membrane bundle 5 are the first regions A1, and the outside of the hollow fiber membrane 5a is the second region A2. However, the first regions A1 and the second region A2 may be reversed.

In the tubular case 2 there are provided shell side conduits 3 and 4 for fluid introduction and removal, each protruding outward from the tubular case 2.

At both ends of the tubular case 2 there are situated header sections 8 and 9 to which tubing is connected. At each of the header sections 8 and 9 there are provided core side conduits 10 and 11 serving as entrances and exits for fluid. At both ends of the hollow fiber membrane bundle 5 housed in the tubular case 2 there may be disposed imbalance controlling members (not shown) to reduce imbalance of the density distribution of the plurality of hollow fiber membranes 5a.

Figure 2:
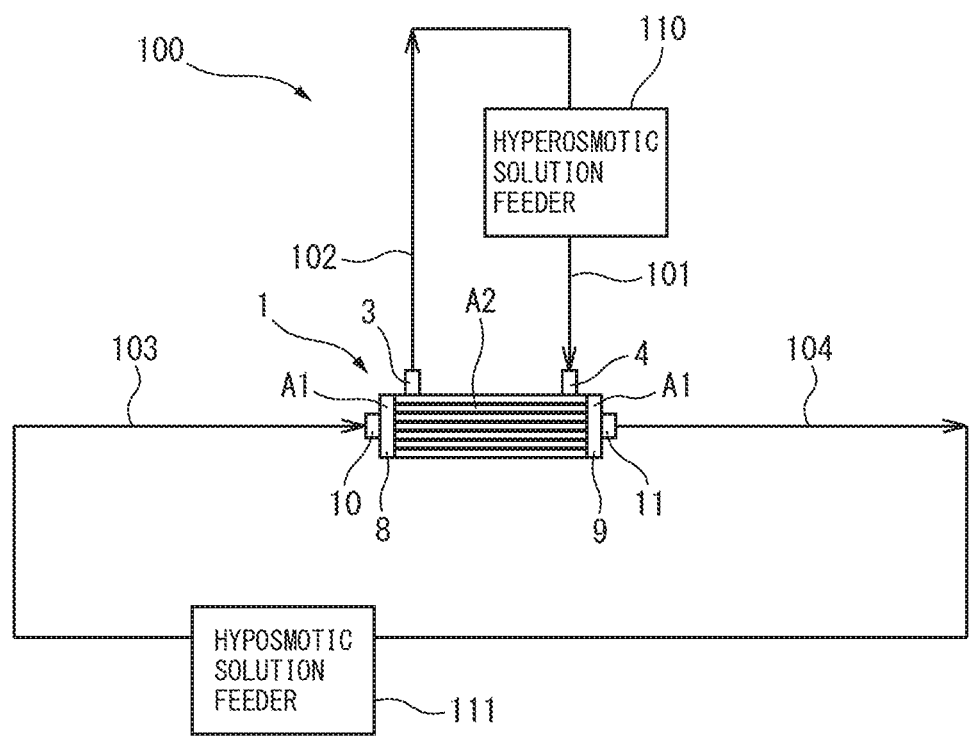
FIG. 2 is a diagram schematically showing a construction example of the forward osmosis treatment system of the invention.

FIG. 2 is a diagram schematically showing a construction example of the forward osmosis treatment system of the invention. This forward osmosis treatment system employs the hollow fiber membrane module 1 shown in FIG. 1.

The forward osmosis treatment system 100 of FIG. 2 is intended for forward osmosis treatment, for example. In the hollow fiber membrane module 1, a hyperosmotic solution is supplied from the shell side conduit 4 to the second region A2 which is the outside of the hollow fiber membrane 5a, and a hyposmotic solution is supplied from the header section 8 to the first region A1 which is at one of both ends of the hollow fiber membrane bundle 5.

The forward osmosis treatment system 100 comprises a supply tube 101 that is connected to the shell side conduit 4 of the hollow fiber membrane module 1 and supplies a hyperosmotic solution from a hyperosmotic feeder 110, and a circulation tube 102 that is connected to the shell side conduit 3 and delivers circulating fluid. The circulation tube 102 is connected to the hyperosmotic feeder 110. In addition, a pressure gauge and various valves (none shown) may be disposed along the supply tube 101 and circulation tube 102.

The forward osmosis treatment system 100 comprises a supply tube 103 that is connected to the core side conduit 10 of the hollow fiber membrane module 1 and supplies a hyposmotic solution from a hyposmotic feeder 111, and a circulation tube 104 that is connected to the core side conduit 11 and delivers a hyposmotic solution. The circulation tube 104 is connected to the hyposmotic feeder 111. In addition, a pressure gauge and various valves (none shown) may be disposed along the supply tube 103 and circulation tube 104.

The hollow fiber membrane module 1 has the shell side conduit 3 connected to the circulation tube 102 and the core side conduit 10 of the header section 8 connected to the supply tube 103 of the hyposmotic solution. The shell side conduit 4 is connected to the supply tube 101 of the hyperosmotic solution, and the core side conduit 11 of the header section 9 is connected to the circulation tube 104.

In this forward osmosis treatment system 100, the hyperosmotic solution is introduced from the hyperosmotic feeder 110 to the supply tube 101 and shell side conduit 4, to the second region A2 which is the outside of the hollow fiber membrane 5a of the hollow fiber membrane module 1. The hyposmotic solution is introduced from the hyposmotic feeder 111 through the supply tube 103 and core side conduit 10, to the first region A1 which is at one of the ends of the hollow fiber membrane bundle 5 of the hollow fiber membrane module 1.

The hyposmotic solution supplied to the first region A1 on the header section 8 side flows through the inside of the hollow fiber membrane 5a. During this time, a portion of the solvent (for example, water) of the hyposmotic solution migrates through the fiber membrane 5a which is a semi-permeable membrane, to the second region A2 which is the outside of the fiber membrane 5a. The hyperosmotic solution flowing through the second region A2 is diluted by the solvent that has migrated to the second region A2. The hyposmotic solution that has migrated to the header section 9 end is discharged from the opening at the end of the fiber membrane 5a through the first region A1 in the header section 9, and out into the circulation tube 104 through the core side conduit 11. The diluted hyperosmotic solution is discharged from the second region A2 through the shell side conduit 3.

The above explanation concerns dilution of a hyperosmotic solution using the forward osmosis treatment system 100. However, there is no limitation to this mode, and other types of forward osmosis treatment may be carried out.

The explanation above assumed that the hollow fiber membrane module 1 had both ends of the hollow fiber membrane bundle 5 as the first regions A1 (hyposmotic side) and the outside of the fiber membrane 5a as the second region A2 (hyperosmotic side). However, the invention is not limited to this construction, and it may instead have both ends of the hollow fiber membrane bundle 5 as second regions A2 (hyperosmotic side) and the outside of the fiber membrane 5a as the first region A1 (hyposmotic side).

In the forward osmosis treatment system of the invention either or both the hyposmotic solution and the hyperosmotic solution may also include an organic compound.

Examples of organic compounds in the hyposmotic solution include lower alcohols such as methanol, ethanol, 1-propanol and 2-propanol; C6 or greater higher alcohols; glycols such as ethylene glycol and propylene glycol; aliphatic hydrocarbons such as pentane, hexane, decane, undecane and cyclooctane; aromatic hydrocarbons such as benzene, toluene and xylene; mineral oils, dimethylformamide, dimethyl sulfoxide, dimethylacetamide, and pyridine, which are organic solvents commonly used in industry and for testing and research.

The polyketone composing the support layer of the forward osmosis membrane of the invention is stable against a variety of organic compounds. Therefore, prolonged stable operation is possible using the forward osmosis treatment system of the invention, when dealing with treated water that potentially contains organic compounds, by mean such as waste water treatment, concentration, or dehydration.

The hyperosmotic solution to be used, when the hyposmotic solution contains organic compounds, may be a solution with relatively high osmotic pressure compared to the hyposmotic solution, and there are no particular restrictions on its solutes. Examples of solutes in this case include salts that are readily soluble in water, such as sodium chloride, potassium chloride, sodium sulfate, ammonium chloride, ammonium sulfate and ammonium carbonate; alcohols such as methanol, ethanol, 1-propanol and 2-propanol; glycols such as ethylene glycol and propylene glycol; polymers such as polyethylene oxide and propylene oxide; and copolymers of these polymers.

Particularly when using a high-viscosity solution such as a solution containing a polymer, it is possible to effectively minimize the interior concentration polarization of solutes in the support layer, and increase the water permeation volume as a result, by using a forward osmosis membrane of the invention having a high porosity, low curvature, and employing a polyketone porous membrane with a thin dense support layer as the support layer.

There are no particular restrictions on the organic compounds of the hyperosmotic solution. The organic compounds in this case may be dissolved components that increase the osmotic pressure relative to the hyposmotic solution. Specific examples of organic compounds in this case include saccharides such as glucose and fructose; fertilizers; refrigerants; alcohols such as methanol, ethanol, 1-propanol and 2-propanol; glycols such as ethylene glycol and propylene glycol; polymers such as polyethylene oxide and propylene oxide; and copolymers of these polymers.

The organic compounds (solutes) to be included in the hyperosmotic solution are preferably dissolved components such that the solutes and water undergo solid-liquid separation or liquid-liquid separation by temperature, from the viewpoint of facilitating recovery when the water is to be recovered from the hyperosmotic solution. Examples of such solutes include temperature-responsive polymers such as poly(N-isopropylacrylamide); and random copolymers or sequential copolymers of low molecular weight diols (for example, 1,2-propanediol, 1,3-propanediol and 1,2-ethanediol).

The polyketone composing the support layer of the forward osmosis membrane of the invention is stable against the aforementioned organic compounds. Therefore, prolonged stable operation is possible using the forward osmosis treatment system of the invention, when dealing with treated water that potentially contains organic compounds, including waste water treatment and concentration.

Particularly when using a high-viscosity solution such as a solution containing a polymer, it is possible to effectively minimize the interior concentration polarization of solutes in the support layer, and thus increase the water permeation volume, by using a forward osmosis membrane of the invention having a high porosity, low curvature, and employing a polyketone porous membrane with a thin dense support layer as the support layer.

The above explanation assumed an example of using a hollow fiber semi-permeable membrane unit. However, the method of the invention is not limited to this construction, and instead a semi-permeable membrane unit with a flat form (flat membrane form) may be used. An embodiment of this case will now be described with reference to the accompanying drawings.

Figure 4:
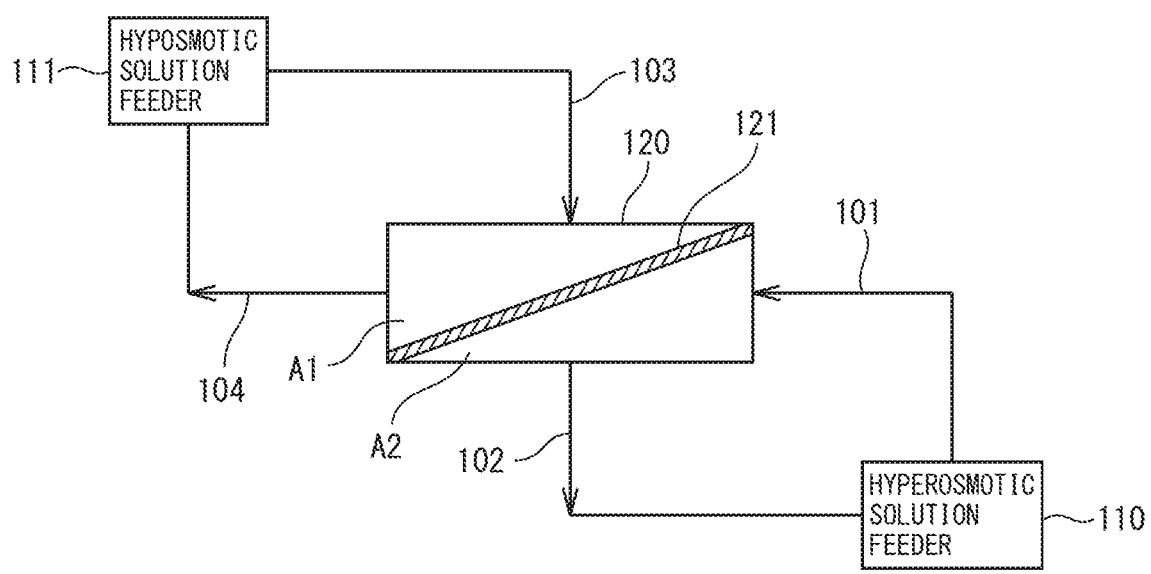
FIG. 4 is a diagram schematically showing a construction example of a forward osmosis treatment system of the invention using a flat semi-permeable membrane unit.

FIG. 4 is a diagram schematically showing a construction example of a forward osmosis treatment system of the invention using a flat semi-permeable membrane unit.

The forward osmosis treatment system of FIG. 4 comprises a semi-permeable membrane unit 120 including a flat semi-permeable membrane 121 housed in a cuboid case, a first region A1 and second region A2 mutually partitioned across the semi-permeable membrane 121, a hyposmotic solution feeder 111 that feeds a hyposmotic solution to the first region A1, and a hyperosmotic solution feeder 110 that feeds a hyperosmotic solution to the second region A2.

The forward osmosis treatment system comprises a supply tube 101 that supplies a hyperosmotic solution from the hyperosmotic feeder 110 and a circulation tube 102 that delivers circulating fluid, and further comprises a supply tube 103 that supplies a hyposmotic solution from the hyposmotic feeder 111 and a circulation tube 104 that delivers the hyposmotic solution. A pressure gauge and various valves (none shown) may be disposed along each of the supply tubes 101 and 103 and circulation tubes 102 and 104.

The semi-permeable membrane unit may be, more specifically, a spiral module such as described in Japanese Unexamined Patent Publication No. 2014-23985, for example.

<Water Production Method>

The water production method of the invention employs the forward osmosis treatment system of the invention as described above as the membrane separation means.

In the water production method of the invention, the forward osmosis membrane unit (semi-permeable membrane unit) is used, and either the hyposmotic solution is contacted on the thin membrane layer side that exhibits semi-permeable membrane performance, which is the separation-active layer, and the hyperosmotic solution is contacted with the opposite side, or the hyperosmotic solution is contacted with the thin membrane layer side and the hyposmotic solution is contacted with the opposite side. After water has migrated from the hyposmotic solution to the hyperosmotic solution through the forward osmosis membrane unit, the water is recovered from the hyperosmotic solution, to produce water.

The hyposmotic solution in this case may contain inorganic solutes. The hyposmotic solution and hyperosmotic solution may each be pretreated by a known technique such as filtration prior to treatment with the forward osmosis treatment system of the invention, to remove contaminants such as fine particles.

The temperature during the water production is not particularly restricted.

<Method for Concentration of Water-Containing Substance>

The method for concentration of a water-containing substance according to the invention employs the forward osmosis treatment system of the invention.

In the method for concentration of a water-containing substance according to the invention, the forward osmosis membrane unit (semi-permeable membrane unit) is used, and either the hyposmotic solution is contacted on the thin membrane layer side that exhibits semi-permeable membrane performance and the hyperosmotic solution is contacted with the opposite side, or the hyperosmotic solution is contacted with the thin membrane layer side and the hyposmotic solution is contacted with the opposite side. Also, concentration and dehydration of water-containing substances is accomplished as the water permeates from the water-containing substance to the hyperosmotic solution through the membrane.

The water-containing substance that is to be concentrated and dehydrated is not particularly restricted so long as it is a water-containing substance that can be concentrated by a forward osmosis membrane unit. The substance to be concentrated may be either an organic compound or inorganic compound.

For concentration and dehydration of a solution containing an organic compound, examples of organic compounds include carboxylic acids such as acetic acid, acrylic acid, propionic acid, formic acid, lactic acid, oxalic acid, tartaric acid and benzoic acid; organic acids such as sulfonic acid, sulfinic acid, habitsuru acid, uric acid, phenols, enols, diketone-type compounds, thiophenols, imides, oximes, aromatic sulfonamides, primary nitro compounds or secondary nitro compounds; lower alcohols such as methanol, ethanol, 1-propanol and 2-propanol; C6 or greater higher alcohols; glycols such as ethylene glycol and propylene glycol; aliphatic hydrocarbons such as pentane, hexane, decane, undecane and cyclooctane; aromatic hydrocarbons such as benzene, toluene and xylene; mineral oils; ketones such as acetone and methyl isobutyl ketone; aldehydes such as acetaldehyde; ethers such as dioxane and tetrahydrofuran; amides such as dimethylformamide and N-methylpyrrolidone; nitrogen-containing organic compounds such as pyridine; and esters such as acetic acid esters and acrylic acid esters; as well as organic solvents, saccharides, fertilizers or enzymes commonly used in industry or for testing and research, such as dimethyl sulfoxide.

The water-containing substance to be concentrated or dehydrated may also be a polymer compound that forms a mixture with water. Examples of such polymer compounds include polyols such as polyethylene glycol and polyvinyl alcohol; polyamines; polysulfonic acids; polycarboxylic acids such as polyacrylic acid; polycarboxylic acid esters such as polyacrylic acid esters; modified polymer compounds that have been modified by graft polymerization; and copolymerized polymer compounds obtained by copolymerization of non-polar monomers such as olefins with polar monomers with polar groups such as carboxyl groups.

The water-containing substance to be concentrated or dehydrated may also be an azeotropic mixture such as an ethanol aqueous solution. Specific examples include mixtures of alcohols such as ethanol, 1-propanol, 2-propanol, 1-butanol and 2-butanol with water; mixtures of esters such as ethyl acetate, ethyl acrylate and methyl methacrylate with water; mixtures of carboxylic acids such as formic acid, isobutyric acid and valeric acid with water; mixtures of aromatic organic compounds such as phenol and aniline with water; and mixtures of nitrogen-containing compounds such as acetonitrile and acrylonitrile with water. By using the forward osmosis treatment system of the invention it is possible to accomplish selective removal of water for concentration of azeotropic mixtures, in a more efficient manner than concentration by distillation.

The water-containing substance to be concentrated or dehydrated may also be a mixture of water and a polymer, such as a latex. Examples of polymers used in latexes include olefin-polar monomer copolymers such as polyvinyl acetate, polyvinyl alcohol, acrylic resins, polyolefins and ethylene-vinyl alcohol copolymers; thermoplastic resins such as polystyrene, polyvinyl ether, polyamides, polyesters and cellulose derivatives; thermosetting resins such as urea resins, phenol resins, epoxy resins and polyurethanes; and rubbers including natural rubber, polyisoprene, polychloroprene and styrene-butadiene copolymers. A surfactant may also be included in the latex.

As water-containing substances to be concentrated or dehydrated there may also be mentioned liquid foods such as fruit juices, alcoholic beverages and vinegar; liquid fertilizers; waste water such as household waste water and industrial waste water; and aqueous solutions of recovered volatile organic compounds (VOC). When the method of the invention is to be applied for concentration of a liquid food, the concentration can be carried out at low temperature, unlike a method such as evaporation that requires heating, and it is therefore preferred as the concentration or volume reduction can be accomplished without impairing the flavor.

The forward osmosis membrane of the invention is resistant to acids. Thus, the concentration method of the invention can also be effectively utilized for concentration of organic acids from water-containing organic acids, such as a mixture of water and acetic acid, for example, or for removal of water in a reaction system used to promote esterification reaction.

When an aqueous solution containing inorganic compounds is to be concentrated or dehydrated, the inorganic compounds may be, for example, metallic particles; or anions such as metal ions, sulfate ions and nitrate ions.

<Method of Diluting Solution>

The method of diluting a solution according to the invention employs the forward osmosis treatment system of the invention.

In the method of diluting a solution according to the invention, the forward osmosis membrane unit (semi-permeable membrane unit) is used, and either the hyposmotic solution is contacted on the thin membrane layer side which is the separation-active layer, and the hyperosmotic solution is contacted with the opposite side, or the hyperosmotic solution is contacted with the thin membrane layer side and the hyposmotic solution is contacted with the opposite side. Water is caused to permeate from the hyposmotic solution to the hyperosmotic solution through the forward osmosis membrane, for dilution of the hyperosmotic solution. The substance to be diluted is not particularly restricted, and may be a fertilizer or refrigerant, for example.

The hyposmotic solution and hyperosmotic solution may each be pretreated by a known technique such as filtration prior to treatment with the forward osmosis treatment system of the invention, to remove contaminants such as fine particles.

The temperature during the dilution is not particularly restricted.

<Electric Power Generation Method>

The electric power generation method of the invention employs the forward osmosis treatment system of the invention.

In the electric power generation method of the invention, the forward osmosis membrane unit (semi-permeable membrane unit) is used, and either the hyposmotic solution is contacted on the thin membrane layer side which is the separation-active layer, and the hyperosmotic solution is contacted with the opposite side, or the hyperosmotic solution is contacted with the thin membrane layer side and the hyposmotic solution is contacted with the opposite side. Also, by causing migration of water from a hyposmotic solution to a hyperosmotic solution through a forward osmosis membrane, the flow rate of the hyperosmotic solution increases, driving a water flow electric generator by the increased flow rate to generate electricity.

EXAMPLES

The invention will now be explained in greater detail by the following examples. However, it is to be understood that the scope of the invention is not limited by these examples.

The evaluations in the examples and comparative examples were according to the following methods.

1. Evaluation of Form Properties of Support Layer and Forward Osmosis Membrane (1) Inner Diameter and Outer Diameter of Hollow Fibers A cross-section perpendicular to the lengthwise direction of the hollow fiber membrane was photographed at 5 arbitrary locations in the lengthwise direction using a digital microscope (model: VHX-5000) by Keyence Corp., and the inner diameter and outer diameter were measured at 2 arbitrary points of each cross-sectional image. The mean inner diameter r (μm) and mean outer diameter R (μm), obtained as the number-average values of the total of 10 measurements, were recorded as the inner diameter and outer diameter of the hollow fiber membrane.

(2) Membrane Thickness (2-1) Flat Membrane

Measurement points were set at 3×3 points (total of 9) in a grid-like manner at 5 mm spacings on the flat membrane. The membrane thickness at each measurement point was measured using a dial gauge (PEACOCK No. 25 by Ozaki Manufacturing Co., Ltd.), and the mean thickness Lp (μm) obtained as the number-average value was recorded as the membrane thickness of the flat membrane.

(2-2) Hollow Fiber Membrane

Using the mean inner diameter r and mean outer diameter R of the hollow fiber membrane determined in (1) above, the mean thickness Ln (μm) of the hollow fiber membrane obtained according to the mathematical expression $(R-r)/2$ was recorded as the membrane thickness of the hollow fiber membrane.

(3) Porosity (3-1) Porosity of Flat Membrane (Including Composite Membrane)

A 5 cm×5 cm test piece was cut out from the flat membrane, and the mass G (g) was measured. The mean thickness Lp (μm) determined in (2) above and mass-average density ρ(g/cm³) were used to calculate the porosity of the flat membrane, according to the following formula:

$$\text{Porosity (\%)} = \{1 - G/5^2/\rho/(Lp \times 10^{-4})\} \times 100.$$

The mass-average density ρ in the formula is the mass-average density calculated from the mass G of the flat membrane, the mass density of polyketone, polyester and polypropylene composing the flat membrane, and the basis weight of the flat membrane. The mass densities used for polyketone, polyester and polypropylene were 1.3 g/cm³, 1.4 g/cm³ and 0.9 g/cm³, respectively.

(3-2) Porosity of Hollow Fiber Membrane

The porosity of the membrane section in the hollow fiber membrane was calculated using the following formula (3).

$$\text{Porosity (\%)} = (1 - G/\rho/V) \times 100 \tag{3}$$

G in the formula is the mass (g) of the hollow fiber membrane, and it was measured using 10 bundled hollow fiber membranes with lengths of 70 cm. The variable ρ is the density (g/cm³) of the polymer composing the hollow fiber membrane, and the value used was 1.30 g/cm for a polyketone hollow fiber membrane and 1.37 g/cm$^3$ for a polyether sulfone hollow fiber membrane. The variable V is the volume (cm$^3$) of the membrane section of the hollow fiber membrane, and it was calculated from the outer diameter of the hollow fiber membrane measured by the method of (2) above, the mean thickness of the membrane section of the hollow fiber membrane measured by the method of (5) above, and the length (70 cm) and number (10) of the hollow fibers.

(4) Maximum Pore Size

The maximum pore size of the support layer was measured according to JIS K3832 (bubble point method), using a Palm Porometer (model: CFP-1200AEX) by PMI Co. as the measuring apparatus, and using GALWICK (surface tension=15.6 dyne/cm) by PMI Co. as the immersion liquid.

(5) Mean Thickness of Membrane Section of Polyketone Support Layer and Mean Thickness of Thin Membrane Layer (Polyamide Layer)

A polyketone membrane (flat membrane or hollow fiber membrane) on which the polyamide thin membrane layer had been laminated was frozen and sliced to fabricate a cross-section sample. The cross-section sample was observed using a scanning electron microscope (Model S-4800 by Hitachi, Ltd.), under conditions with an acceleration voltage of 1.0 kV, a WD of 5 mm standard of ±0.7 mm, and an emission current setting of 10±1 to obtain a SEM image. The mean thickness of the membrane section of the polyketone support layer and the mean thickness of the polyamide thin membrane layer were each measured based on the obtained SEM image.

2. Performance Evaluation of Forward Osmosis Membrane (1) Measurement of Structural Parameter S, Water Permeability Coefficient A and Salt Permeability Coefficient B (for Flat Membrane, Examples 1 to 6 and Comparative Examples 1 to 7).

The osmosis membranes obtained in the examples and comparative examples were subjected to both a pressure-driven reverse osmosis treatment test and a forward osmosis-driven forward osmosis treatment test, to determine the value of the structural parameter S, which represents an index of the degree of interior concentration polarization of the support layer, as well as the water permeability coefficient A and salt permeability coefficient B which represent the osmosis performance of the thin membrane layer.

[Reverse Osmosis Treatment Test]

Reverse osmosis treatment of ultrapure water or a 0.1 M NaCl aqueous solution was carried out with pressurization in a range of 0 MPa to 2 MPa, and the water permeation volume $J_w^{water\ RO}$ or $J_w^{NaCl\ RO}$ (units: L·m$^{-2}$·h$^{-1}$), and the salt rejectivity R (units: %) (=1−(NaCl concentration of supplied solution/NaCl concentration of permeated solution) were determined, calculating the water permeability coefficient A and salt permeability coefficient B of the thin membrane layer according to the following formula. Reference was made to Sidney Loeb et al., J. Membr. Sci., 129(1997), pp 243-249 and K. L. Lee et al., J. Membr. Sci., 8(1981), pp 141-171 for calculation of both coefficients.

$A = J_w^{water\ RO}/\Delta P$ $B = J_w^{NaCl\ RO} ((1-R)/R) \exp(-J_w^{Nacl\ RO}/k_f)$ P: Applied pressure
R: Rejectivity (=1−$C_p/C_b$)
$C_p$: Permeated water concentration
$C_b$: Bulk solution concentration of supplied solution
$k_f$: Mass transfer coefficient (=$J_w^{NaCl\ RO}$/ln [ΔP (1−$J_w^{NaCl\ RO}/J_w^{water\ RO}$)/($\pi_b - \pi_p$)]
$\pi_p$: Osmotic pressure of permeated water
$\pi_b$: Bulk solution osmotic pressure

[Forward Osmosis Treatment Test]

Forward osmosis treatment was performed using a 0.3 M to 1.2 M NaCl aqueous solution as the concentrated solution (draw solution), and ultrapure water as the diluting solution (feed solution), with the thin membrane layer facing the diluting solution side. The water permeation volume $J_w^{FO}$ (units: L·m$^{-2}$·h$^{-1}$) was also measured, and the previously determined water permeability coefficient A and salt permeability coefficient B were plugged into the following formula to calculate the structural parameter S of the support layer. Reference was made to A. Tiraferri et al., J. Membr. Sci., 367(2011), pp 340-352 for calculation of the structural parameter S.

$J_w^{FO} = (D/S)\ln [(B+A\pi_{DS})/(A\pi_{FS}+B+J_w^{FO})]$

D: Diffusion coefficient of solute
$\pi_{DS}$: Bulk osmotic pressure of concentrated solution
$\pi_{FS}$: Bulk osmotic pressure of diluting solution The structural parameter S of the support layer is theoretically represented by membrane thickness×curvature/porosity, and it is an index of the difficulty of diffusion of solutes inside the support layer. Therefore, a smaller structural parameter S represents easier diffusion of solutes inside the support layer, and a lower interior concentration polarization.

(2) Measurement of Water Permeation Volume and Salt Back Diffusion (Examples X1 to X4 and Comparative Example X1, for Hollow Fiber Membrane Module).

A 50 L tank containing 30 L of purified water was connected to the core side conduits (reference numerals 10 and 11 in FIG. 1) of the hollow fiber membrane modules obtained in the examples and comparative examples via tubing, and the purified water was circulated with a pump. The tank was equipped with a conductivity meter to allow measurement of migration of salts into the purified water. Also, a 50 L tank containing 20 L of brine at a concentration of 3.5 mass % was connected to the shell side conduits (reference numerals 3 and 4 in FIG. 1) via tubing, and the brine was circulated with a pump. The core side tank and shell side tank were each set on a balance to allow measurement of migration of the salts and water. Operation was conducted simultaneously with a flow rate on the core side of 2.2 L/min and a flow rate on the shell side of 8.8 L/min, and the salt migration volume and water migration volume were each measured. The water permeation volume was calculated from the water migration volume, and the salt back diffusion was calculated from the salt migration volume.

(3) Measurement of Water Permeation Volume and Salt Back Diffusion (Hyperosmotic Solution=Brine, for Forward Osmosis Membrane Flow System, Examples Y1 to Y3 and Comparative Examples Y1 to Y3)

Using each of the composite hollow fiber membrane modules obtained in the examples and comparative examples, the contents of both tanks were circulated in the same manner as in (2) above, except that the contents of the 50 L tank connected to the core side conduit were:

test solution A (30 L purified water),
test solution B (solution comprising 28.5 L purified water and 1.73 L toluene (mass ratio=95:5)), or
test solution C (solution comprising 29.85 L purified water and 0.19 L acetone (mass ratio=99.5:0.5)), and the contents of the 50 L tank connected to the shell side conduit consisted of 20 L brine at a concentration of 3.5 mass %, and the salt migration volume and water migration volume were each measured. The water permeation volume was calculated from the water migration volume, and the salt back diffusion was calculated from the salt migration volume.

(4) Measurement of Water Permeation Volume (Hyperosmotic Solution=Organic Compound Solution, for Forward Osmosis Membrane Flow System, Example Y4 and Comparative Example Y4)

Using the composite hollow fiber membrane modules obtained in Example Y4 and Comparative Example Y4, purified water and a polyethylene glycol aqueous solution were circulated in the same manner as (2) above, except that the content of the 50 L tank connected to the shell side conduit was a 20 L aqueous solution containing polyethylene glycol 200 (product of Tokyo Kasei Kogyo Co., Ltd.) at a concentration of 15 mass %, and the water migration volume was measured. The water permeation volume was calculated from the water migration volume.

The leakage of polyethylene glycol was also evaluated by the following method.

Operation of 10 minutes under the same conditions as described above, as one cycle, was repeated 10 times for the test. 10 ml of solution on the core side (purified water) after the 10 tests was removed onto a glass plate and heated at 100° C. for 20 minutes, to remove the moisture, after which the remaining substance was subjected to IR measurement using an infrared spectrometer (Model FT/IR-6200 by JASCO Corp.), to examine the presence or absence of polyethylene glycol, which was used to evaluate the presence or absence of polyethylene glycol leakage.

(5) Measurement of Pressure Resistance (for Flat Membrane, Examples 1 to 6 and Comparative Examples 1 to 7)

In 2(1) above, the maximum pressure at which the osmosis membrane did not rupture, when the reverse osmosis treatment test was conducted varying the applied pressure by the ultrapure water or NaCl aqueous solution, was recorded as the pressure resistance of the osmosis membrane.

<Fabrication of Flat Forward Osmosis Membrane and Evaluation of Performance>

Example 1

A polymer solution comprising 10 mass % of polyketone (product of Asahi Kasei Fibers Corp., limiting viscosity: 2.2 dl/g, weight-average molecular weight: 200,000), 58.5 mass % of resorcinol and 31.5 mass % of water was cast onto a glass substrate using an applicator. The cast glass substrate was immersed in a coagulating bath comprising a water/methanol mixed solvent (75/25 (w/w)), to form a polyketone porous membrane (asymmetrical membrane). The obtained polyketone porous membrane was rinsed with water, acetone and hexane in that order and air-dried, to obtain a polyketone support layer with a thickness of 70 μm, a porosity of 80.6%, and a maximum pore size of 150 nm as determined by the bubble point method.

The obtained polyketone support layer (dense side) was coated with an amine aqueous solution (thin membrane layer-forming coating solution) containing 2 mass % 1,3-phenylenediarnine, 4 mass % camphorsulfonic acid, 2 mass % triethylamine and 0.25 mass; sodium dodecyl sulfate, and allowed to stand for 300 seconds. The membrane was then allowed to stand vertically for 60 seconds to remove the excess amine aqueous solution. Next, the coated side was further coated with a 1,3,5-trimethoyl chloride (trimesic acid trichloride) hexane solution at a concentration of 0.15 mass %, and allowed to stand for 120 seconds. The membrane was then allowed to stand vertically for 60 seconds to remove the excess trimesic acid chloride solution, to obtain a laminated body.

The laminated body obtained in this manner was subjected to annealing treatment at 90° C. for 600 seconds, and after thorough rinsing with water there was obtained a forward osmosis membrane 1 having a polyamide thin membrane layer formed on a polyketone support layer.

The forward osmosis membrane 1 was evaluated by the methods described above. When using a concentrated solution (0.6 N NaCl aqueous solution), the water permeation volume $J_W^{FO}$ was 19.5 Lm$^{-2}$ h$^{-1}$, the water permeability coefficient A was 1.21 Lm$^{-2}$ h$^{-1}$ bar$^{-1}$, the salt permeability coefficient B was 0.20 Lm$^{-2}$ h$^{-1}$, the structural parameter S was 200 μm, and the pressure resistance was 1.2 MPa.

Examples 2 to 5

Forward osmosis membranes 2 to 5 were obtained in the same manner as Example 1, except that the composition of the solidifying solution for formation of the polyketone support layer, the thickness of the polyketone support layer and the composition of the coating solution for formation of the thin membrane layer in Example 1 were each changed as shown in Table 1.

The forward osmosis membranes were evaluated by the methods described above. The evaluation results are shown in Table 3.

Example 6

One side of a hydrophilic-treated polypropylene spun-bonded nonwoven fabric (membrane thickness: 247 μm, porosity: 87%) was coated with a polymer solution comprising 10 mass % polyketone, 58.5 mass % resorcinol and 31.5 mass % water, and then immersed in a coagulating bath comprising a water/methanol mixed solvent (60/40 (w/w)), to fabricate a polyketone composite membrane. The obtained polyketone composite membrane was rinsed with water, acetone and hexane in that order and air-dried, to obtain a polyketone support layer with a thickness of 269 μm, a porosity of 81.5%, and a maximum pore size of 150 nm as determined by the bubble point method.

A forward osmosis membrane 6 was obtained by forming a polyamide thin membrane layer on a support layer in the same manner as Example 4, except for using the support layer.

The obtained forward osmosis membrane 6 was evaluated by the methods described above. The evaluation results are shown in Table 3.

For Example 6, a nonwoven fabric with a high porosity was used as the reinforcing material of the polyketone porous membrane, to increase the pressure resistance while maintaining a high water permeability.

Comparative Example 1

A polymer solution (porous layer-forming coating solution) composed of 15 mass % polysulfone (product of Sigma Aldrich, weight-average molecular weight: 22,000) and 85 mass % 1-methyl-2-pyrrolidone (NMP) was cast onto a nonwoven fabric prewetted with NMP, using an applicator. The cast nonwoven fabric was immersed in a coagulating bath comprising water, and a polysulfone porous membrane was formed. The obtained polysulfone porous membrane was repeatedly rinsed with water and air-dried to obtain a polysulfone support layer. The nonwoven fabric used was a polyethylene terephthalate spunbonded nonwoven fabric (membrane thickness: 350 μm, porosity: 86%).

On the obtained polysulfone support layer there was formed a polyamide skin layer in the same manner as Example 1, to fabricate a forward osmosis membrane 11. Comparative Example 1 was conducted with reference to the description in Alberto Tiraferri et al., J. Membr. Sci., 367 (2011), pp 340-352. For this forward osmosis membrane 11, the maximum pore size of the support layer could not be measured by the bubble point method, and therefore the maximum pore size was judged to be less than 35 nm.

The obtained forward osmosis membrane 11 was evaluated by the methods described above. The evaluation results are shown in Table 3.

Comparative Example 2

A polymer solution (porous layer-forming coating solution) composed of 12 mass % polysulfone (product of Sigma Aldrich, weight-average molecular weight: 22,000) and 88 mass % 2-pvrrolidinone (BL) was cast onto a glass substrate using an applicator in an environment with a temperature of 25° C. and a humidity of 70%. The glass substrate 30 seconds after casting was immersed for 24 hours in a coagulating bath comprising water, and a polysulfone porous membrane was formed. The obtained polysulfone porous membrane was repeatedly rinsed with water and air-dried, after which it was released from the glass substrate to obtain a polysulfone support layer. On the obtained polysulfone support layer there was formed a polyamide skin layer in the same manner as Example 1, to fabricate a forward osmosis membrane 12.

Comparative Example 2 was conducted with reference to the description in Journal of Membrane Science, 362(2010), pp 360-373.

The obtained forward osmosis membrane 12 was evaluated by the methods described above. The evaluation results are shown in Table 3.

Comparative Example 3

A forward osmosis membrane 13 was obtained in the same manner as Comparative Example 1, except that the composition of the porous layer-forming coating solution in Comparative Example 1 was changed as shown in Table 2.

The forward osmosis membrane 13 was evaluated by the methods described above. The evaluation results are shown in Table 3.

The forward osmosis membrane 12 obtained in Comparative Example 2 had numerous pinholes and its performance could not be evaluated.

Comparative Example 4

A membrane-forming solution was prepared by adding 6 g of purified water to a polymer solution of 80 g of polyether ketone (reduced viscosity: 0.96 dl/g, glass transition point: 151° C., melting point: 373° C.) dissolved in 920 g of sulfuric acid to a concentration of 87.6 mass %. After using an applicator to coat a glass plate with the membrane-forming solution to a thickness of 100 μm, it was immersed in a coagulating bath at 24° C. comprising polyethylene glycol with a weight-average molecular weight of 1,000 dissolved in sulfuric acid at a concentration of 75 mass %, and a polyetherketone porous membrane was formed.

The obtained polyether ketone porous membrane was rinsed with flowing water for 3 hours and immersed in ethanol for 3 hours, and then air-dried to obtain a polyether ketone support layer. The maximum pore size of the porous membrane support layer was 140 nm, and the porosity was 66%.

A forward osmosis membrane 14 was obtained by forming a polyamide thin membrane layer on the polyether ketone support layer in the same manner as Example 1.

The forward osmosis membrane 14 had numerous pinholes and its performance could not be evaluated.

Comparative Example 5

For Comparative Example 5, hydrophilic polyvinylidene fluoride (hydrophilic PVDF, trade name "Durapore" by Merck Milipore) was used as the support layer.

A forward osmosis membrane 15 was obtained by forming a polyamide thin membrane layer on the PVDF support layer in the same manner as Example 1.

The obtained forward osmosis membrane 15 was evaluated by the methods described above. The evaluation results are shown in Table 3.

Comparative Examples 6 and 7

Using a cellulose triacetate composite membrane by HTI Co. as the forward osmosis membrane 16 for Comparative Example 6 and a cellulose triacetate asymmetrical membrane by HTI Co. as the forward osmosis membrane 17 for Comparative Example 7, the evaluation was conducted by the methods described above. The evaluation results are shown in Table 3.

TABLE 1

| | Polyketone support layer | | Thin membrane layer forming-coating solution composition (wt %) | | | | | Forward osmosis membrane name |
|---|---|---|---|---|---|---|---|---|
| | Solidifying solution composition (w/w) | Thickness (μm) | 1,3-Phenylene diamine | Camphor-sulfonic acid | Triethyl amine | Sodium dodecyl sulfate | Hexa-methyl phosphoric acid triamide | |
| Example 1 | Water/methanol = 75/25 | 70 | 2 | 4 | 2 | 0.25 | — | Forward osmosis membrane 1 |
| Example 2 | Water/methanol = 75/25 | 150 | 2 | 4 | 2 | 0.25 | — | Forward osmosis membrane 2 |
| Example 3 | Water/methanol = 75/25 | 70 | 2 | 2.3 | 1.1 | 0.15 | 1 | Forward osmosis membrane 3 |

TABLE 1-continued

| | Polyketone support layer | | Thin membrane layer forming-coating solution composition (wt %) | | | | | Forward osmosis membrane name |
|---|---|---|---|---|---|---|---|---|
| | Solidifying solution composition (w/w) | Thickness (μm) | 1,3-Phenylene diamine | Camphor-sulfonic acid | Triethyl amine | Sodium dodecyl sulfate | Hexa-methyl phosphoric acid triamide | |
| Example 4 | Water/methanol = 75/25 | 70 | 2 | 2.3 | 1.1 | 0.15 | 3 | Forward osmosis membrane 4 |
| Example 5 | Water/methanol = 65/35 | 80 | 2 | 2.3 | 1.1 | 0.15 | 3 | Forward osmosis membrane 5 |

TABLE 2

| | Nonwoven fabric used | Porous layer-forming coating solution composition | | | | Thickness (μm) | Maximum pore size (nm) | Forward osmosis membrane name |
|---|---|---|---|---|---|---|---|---|
| | | Polymer Type | Amount (wt %) | Solvent Type | Amount (wt %) | | | |
| Comp. Example 1 | Yes | Polysulfone | 15 | NMP | 85 | 90 | <35 | Forward osmosis membrane 11 |
| Comp. Example 2 | No*) | Polysulfone | 12 | BL | 88 | 95 | 100 | Forward osmosis membrane 12 |
| Comp. Example 3 | Yes | Polyether sulfone | 20 | NMP | 80 | 80 | 140 | Forward osmosis membrane 13 |

*)For Comparative Example 2, porous layer was removed from glass substrate after forming the porous layer on the glass substrate.

TABLE 3

| | Forward osmosis membrane | | | Water permeation volume $J_{wFO}$ ($Lm^{-2}h^{-1}$) | Thin membrane layer performance | | Support layer performance | |
|---|---|---|---|---|---|---|---|---|
| | Name | Membrane structure | | | Water permeability coefficient A ($Lm^{-2}h^{-1}bar^{-1}$) | Salt permeability coefficient B ($Lm^{-2}h^{-1}$) | Structural parameter S (μm) | Pressure resistance (MPa) |
| | | Porous layer | Thin membrane layer | | | | | |
| Example 1 | Forward osmosis membrane 1 | Polyketone (70 μm) | Polyamide | 19.5 | 1.21 | 0.2 | 200 | 1.2 |
| Example 2 | Forward osmosis membrane 2 | Polyketone (150 μm) | Polyamide | 17.5 | 1.15 | 0.15 | 270 | 1.2 |
| Example 3 | Forward osmosis membrane 3 | Polyketone (70 μm) | Polyamide | 27.8 | 1.64 | 0.21 | 160 | 1.1 |
| Example 4 | Forward osmosis membrane 4 | Polyketone (70 μm) | Polyamide | 35.6 | 2.5 | 0.18 | 160 | 1 |
| Example 5 | Forward osmosis membrane 5 | Polyketone (80 μm) | Polyamide | 40.2 | 2.5 | 0.18 | 95 | 0.6 |
| Example 6 | Forward osmosis membrane 6 | Polyketone (269 μm) | Polyamide | 24.2 | 3.1 | 0.37 | 290 | >2.0 |
| Comp. Example 1 | Forward osmosis membrane 11 | Polysulfone (90 μm) | Polyamide | 7.1 | 1.14 | 0.75 | 1350 | >2.0 |
| Comp. Example 2 | Forward osmosis membrane 12 | Polysulfone (95 μm) | Polyamide | Unmeasurable | | | | |
| Comp. Example 3 | Forward osmosis membrane 13 | Polyether sulfone (80 μm) | Polyamide | 7.5 | 1.15 | 2.1 | 918 | 1.0 |
| Comp. Example 4 | Forward osmosis membrane 14 | Polyether ketone (80 μm) | Polyamide | Unmeasurable | | | | |
| Comp. Example 5 | Forward osmosis membrane 15 | PVDF | Polyamide | 8 | 0.82 | 0.19 | 690 | >2.0 |
| Comp. Example 6 | Forward osmosis membrane 16 | Cellulose triacetate composite membrane | | 5.7 | 0.28 | 0.15 | 1180 | >2.0 |

TABLE 3-continued

| | | Forward osmosis membrane | | Water | Thin membrane layer performance | | Support layer | |
|---|---|---|---|---|---|---|---|---|
| | | | Membrane structure | permeation | Water | Salt | performance | |
| | Name | Porous layer | Thin membrane layer | volume JwFO $(Lm^{-2}h^{-1})$ | permeability coefficient A $(Lm^{-2h-1}bar^{-1})$ | permeability coefficient B $(Lm^{-2}h^{-1})$ | Structural parameter S (μm) | Pressure resistance (MPa) |
| Comp. Example 7 | Forward osmosis membrane 17 | Cellulose triacetate asymmetrical membrane | | 9.1 | 0.5 | 0.4 | 500 | >2.0 |

The details regarding the polymers in Table 2 are as follows.
Polysulfone: Sigma Aldrich, weight-average molecular weight: 22,000
Polyether sulfone: BASF, trade name: "Ultrason"
The abbreviations of the solvents in Table 2 stand for the following.
NMP: N-Methyl-2-pyrrolidone
BL: 2-Pyrrolidinone As will be understood from the results shown in Table 1 to 3, forward osmosis membranes 1 to 6 using polyketone as the support layer had a notably smaller structural parameter S and high water permeation volume compared to the forward osmosis membrane 11 using polysulfone as the support layer, and the commercially available forward osmosis membranes 16 and 17 was obtained. With forward osmosis membranes 1 to 6, it is conjectured that due to the suitability of the support layer structures, the interior concentration polarization of solutes in the support layer was low, and as a result the effective osmotic pressure difference between the thin membrane layers was increased, thereby increasing the water permeation volume.

<Fabrication of Hollow Fiber Forward Osmosis Membrane and Evaluation of Performance>

Example X1

Polyketone with a limiting viscosity of 2.2 dl/g, obtained by complete alternating copolymerization of ethylene and carbon monoxide, was added to a 65 mass % resorcin aqueous solution to a polymer concentration of 15 mass %, and the mixture was stirred and dissolved at 80° C. for 2 hours and defoamed to obtain a uniform transparent dope.

Figure 3:
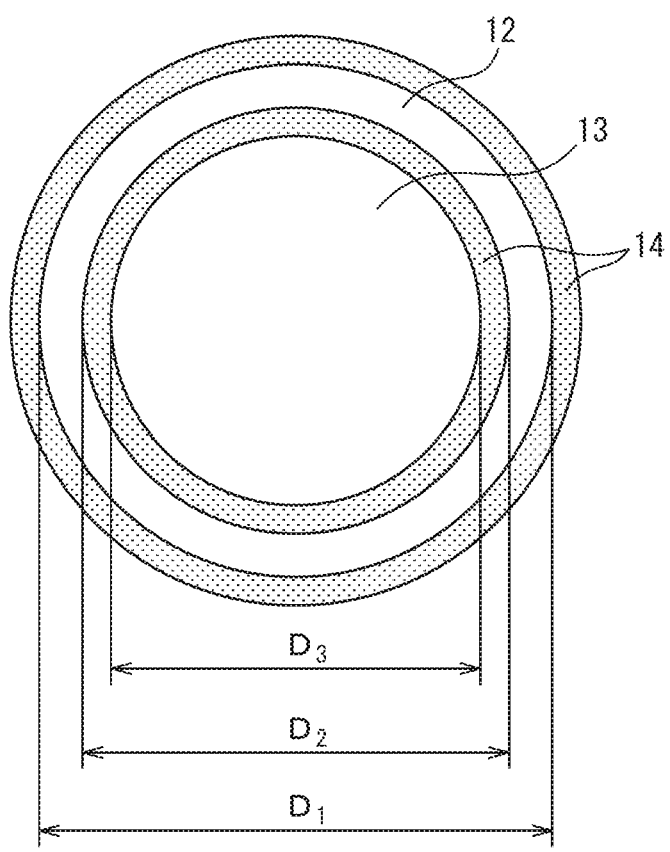
FIG. 3 is a diagram schematically showing the structure of a spinneret of a double tube orifice used for production of a polyketone hollow fiber in the examples.

Using a double-tube orifice spinneret (D1: 0.6 mm, D2: 0.33 mm, D3: 0.22 mm) having the structure shown in FIG. 3, there were simultaneously discharged:
the dope (dope viscosity: 100 poise) adjusted to a temperature of 50° C. from the outer annular orifice, and
a 25 mass % methanol aqueous solution from the inner circular orifice, into a solidifying bath comprising a methanol aqueous solution with a concentration of 40 mass %. The solidified product was raised and wound up while rinsing with water, to obtain a hollow fiber membrane. The obtained hollow fiber membrane was cut to a length of 70 cm, and bundled and rinsed. The rinsed hollow fiber membrane bundle was subjected to solvent exchange with acetone and then solvent exchange with hexane, after which it was dried at 50° C. The porosity of the polyketone hollow fiber membrane obtained in this manner was 78%, and the maximum pore size was 130 nm.

After filling 1,500 polyketone hollow fiber membranes into a cylindrical plastic housing with a diameter of 5 cm and a length of 50 cm, both ends were anchored with an adhesive to fabricate a polyketone hollow fiber membrane module having the structure shown in FIG. 1.

Next, an aqueous solution (first monomer solution) including 2.0 mass % of m-phenylenediamine, 4.0 mass % of camphorsulfonic acid, 2.0 mass % of triethylamine and 0.25 mass % of sodium dodecyl sulfate was filled into the core side of the module (the inner side of the hollow fibers), and allowed to stand for 300 seconds. The solution was then eliminated and air was passed through the core side to remove the excess solution adhering to the hollow fiber membrane. Next, a hexane solution (second monomer solution) of trimesic acid chloride at a 0.15 mass % concentration was conveyed to the core side of the module at a flow rate of 1.5 L/min for 120 seconds, for interfacial polymerization. The core side pressure and shell side pressure during this time were both ordinary pressure, and the polymerization temperature was 25° C. After then flowing nitrogen at 90° C. to the core side of the module for 600 seconds, both the shell side and core side were rinsed with purified water to prepare a forward osmosis hollow fiber membrane module having a polyamide thin membrane layer laminated on the inner side surface of a polyketone hollow fiber membrane.

When the forward osmosis hollow fiber membrane module was evaluated by the methods described above, the water permeation volume was 18.5 kg/(m²×hr) and the salt back diffusion was 1.2 g/(m²×hr). The outer diameter of the polyketone hollow fiber membrane, measured upon disassembling the module, was 1,080 μm, the thickness of the membrane section was 150 μm, and the thickness of the polyamide thin membrane layer was 0.3 μm.

Examples X2 and X3, and Comparative Example X1

A forward osmosis hollow fiber membrane module was fabricated and evaluated in the same manner as Example X1, except that the composition of the dope, the concentration of the solution discharged from the inner circular orifice simultaneously with discharge of the dope from the outer annular orifice, and the composition of the first monomer solution in Example X1 were each as shown in Table 4. For Comparative Example X1, the obtained hollow fiber membrane was cut to a length of 70 cm, bundled and rinsed and then used to fabricate a module and supplied for interfacial polymerization.

The evaluation results are shown in Table 5.

Example X4

The polyketone hollow fiber membrane obtained in Example X3 was immersed in an aqueous solution (first monomer solution) including 2.0 masse of m-phenylenediamine, 4.0 mass, of camphorsulfonic acid, 2.0 mass % of triethylamine and 0.25 masse of sodium dodecyl sulfate, and then allowed to stand at room temperature for 300 seconds. It was then immersed for 120 seconds in a hexane solution (second monomer solution) of trimesic acid chloride at a 0.15 mass % concentration, for interfacial polymerization. This was followed by drying under a nitrogen atmosphere at 90° C. for 600 seconds to fabricate a polyketone hollow fiber membrane having a polyamide thin membrane layer laminated on the outer surface of a polyketone hollow fiber membrane.

After filling 1,500 polyketone hollow fiber membranes having the polyamide thin membrane layer laminated on the outer side surface, into a cylindrical plastic housing with a diameter of 5 cm and a length of 50 cm, both ends were anchored with an adhesive to fabricate a module having the structure shown in FIG. 1. Both the shell side and core side were rinsed with purified water to prepare a forward osmosis hollow fiber membrane module having a polyamide thin membrane layer laminated on the outer side surface of a polyketone hollow fiber membrane.

The forward osmosis hollow fiber membrane module was evaluated in the same manner as Example X1, with the results shown in Table 5.

The details regarding the polymers in Table 4 are as follows.

Polyketone: Complete alternating copolymerization of ethylene and carbon monoxide, limiting viscosity=2.2 dl/g Polyether sulfone: BASF, trade name: "Ultrason"

As will be understood from the results shown in Table 4 and Table 5, the forward osmosis hollow fiber membranes having a polyamide thin membrane layer laminated on either the outer side surface or inner side surface of the polyketone hollow fiber membrane had high water permeation volume and could maintain a low level of of salt back diffusion from the concentrated solution side.

<Repeat Testing of Hollow Fiber Forward Osmosis Membrane>

For the following examples and comparative examples, repeated testing was conducted using hollow fiber membrane modules fabricated in the same manner as Example X1 and Comparative Example X1.

Example Y1

A forward osmosis hollow fiber membrane module (semipermeable membrane unit) having a polyamide thin mem-

TABLE 4

|  | Dope composition | | | Dope viscosity (poise, 50° C.) | Inner orifice discharge solution | First monomer solution composition (wt %) | | | | | Position of polyamide thin membrane layer |
| --- | --- | --- | --- | --- | --- | --- | --- | --- | --- | --- | --- |
|  | Polymer Type | Concentration (wt %) | Solvent | | | m-Phenylene diamine | Camphor-sulfonic acid | Triethyl amine | Sodium dodecylsulfate | Hexamethyl phosphoric acid triamide | |
| Example X1 | Polyketone | 15 | 65 wt % recorcin aqueous solution | 100 | 25 wt % methanol aqueous solution | 2.0 | 4.0 | 2.0 | 0.25 | — | Hollow fiber inside |
| Example X2 | Polyketone | 15 | 65 wt % resorcin aqueous solution | 100 | 25 wt % methanol aqueous solution | 2.0 | 2.3 | 1.1 | 0.15 | 3.0 | Hollow fiber inside |
| Example X3 | Polyketone | 15 | 65 wt % resorcin aqueous solution | 100 | 40 wt % methanol aqueous solution | 2.0 | 4.0 | 2.0 | 0.25 | — | Hollow fiber inside |
| Example X4 | Polyketone | 15 | 65 wt % resorcin aqueous solution | 100 | 25 wt % methanol aqueous solution | 2.0 | 4.0 | 2.0 | 0.25 | — | Hollow fiber outside |
| Comp. Example X1 | Polyether sulfone | 20 | N-Methyl-2-pyrrolidone | 60 | Water | 2.0 | 4.0 | 2.0 | 0.25 | — | Hollow fiber inside |

TABLE 5

|  | Hollow fiber membrane | | | | Thin membrane layer | | Module performance | |
| --- | --- | --- | --- | --- | --- | --- | --- | --- |
|  | Porosity (%) | Maximum pore size (nm) | Outer diameter (μm) | Thickness of membrane section (μm) | Layer position | Thickness (μm) | Water permeation volume (kg/($m^2$ × h)) | Salt back diffusion (g/($m^2$ × h)) |
| Example X1 | 78 | 130 | 1080 | 150 | Inside | 0.3 | 18.5 | 1.2 |
| Example X2 | 78 | 130 | 1050 | 150 | Inside | 0.5 | 35.5 | 1.0 |
| Example X3 | 81 | 150 | 1100 | 200 | Inside | 0.4 | 22.5 | 1.5 |
| Example X4 | 81 | 150 | 1090 | 200 | Outside | 0.3 | 25.2 | 1.1 |
| Comp. Example X1 | 69 | 80 | 1000 | 230 | Inside | 0.3 | 7.5 | 21.0 | brane layer laminated on the inner surface of a polyketone hollow fiber membrane was fabricated in the same manner as Example X1.

The test solutions listed in Table 6 were used as the hyposmotic solutions.

The evaluation results are shown in Table 6.

TABLE 6

|  | Module | Test solution Hyposmotic solution | Test solution Hyperosmotic solution | Water permeation volume (kg/(m² × h)) 1st time | Water permeation volume (kg/(m² × h)) 10th time | Salt back diffusion (g/(m² × h)) 1st time | Salt back diffusion (g/(m² × h)) 10th time | Dimensions of hollow fiber membrane sections (μm) Diameter | Dimensions of hollow fiber membrane sections (μm) Thickness of membrane section (μm) | Thickness of thin membrane layer (μm) |
|---|---|---|---|---|---|---|---|---|---|---|
| Example Y1 | Same as Example X1 | Test solution A (purified water) | 3.5 wt % brine | 18.5 | 18.5 | 1.2 | 1.2 | 1080 | 150 | 0.3 |
| Example Y2 | Same as Example X1 | Test solution B (water-toluene) | 3.5 wt % brine | 16.0 | 16.0 | 1.2 | 1.2 | 1080 | 150 | 0.3 |
| Example Y3 | Same as Example X1 | Test solution C (water-acetone) | 3.5 wt % brine | 15.4 | 15.4 | 1.2 | 1.2 | 1080 | 150 | 0.3 |
| Comp. Example Y1 | Same as Comp. Example X1 | Test solution A (purified water) | 3.5 wt % brine | 7.5 | 7.0 | 21.0 | 21.2 | 1000 | 230 | 0.3 |
| Comp. Example Y2 | Same as Comp. Example X1 | Test solution B (water-toluene) | 3.5 wt % brine | 7.2 | 9.0 | 30.0 | 35.8 | 1000 | 230 | 0.3 |
| Comp. Example Y3 | Same as Comp. Example X1 | Test solution C (water-acetone) | 3.5 wt % brine | 7.0 | 10.0 | 35.0 | 40.2 | 1000 | 230 | 0.3 |

When the water permeation volume and salt back diffusion of the hollow fiber membrane module were measured using:

20 L of brine at a concentration of 3.5 mass % as the hyperosmotic solution, and test solution A (30 L purified water) as the hyposmotic solution, the water permeation volume of the forward osmosis hollow fiber module was 18.5 kg/(m²×hr) and the salt back diffusion was 1.2 g/(m²×hr).

The measured forward osmosis hollow fiber module was used for an additional 9 repeated measurements (total of 10). At the 10th measurement, the water permeation volume was 18.5 kg/(m²×hr) and the salt back diffusion was 1.2 g/(m²×hr).

The diameter of the polyketone hollow fiber membrane, measured upon disassembling the module after the 10th measurement, was 1,080 μm, the thickness of the membrane section was 150 μm, and the thickness of the polyamide thin membrane layer was 0.3 μm. Direct visual observation revealed no particular change in the state of the support layer.

Examples Y2 and Y3, and Comparative Examples Y1 to Y3

Repeated testing was conducted for water permeation volume and salt back diffusion in the same manner as Example Y1, except that in Example Y1, the modules used as forward osmosis hollow fiber membrane modules were as shown in Table 6, fabricated in the same manner as the examples and comparative examples, and The results in Table 6 confirmed that a forward osmosis membrane system of the invention having a polyketone porous membrane as the support layer can stably exhibit high water permeability over a prolonged period and can maintain a low level of salt back diffusion from hyperosmotic solutions, even when the hyposmotic solution contains organic compounds (toluene or acetone) that can permeate the support layer.

Example Y4

A forward osmosis hollow fiber membrane module having a polyamide thin membrane layer laminated on the inner surface of a polyketone hollow fiber membrane was fabricated in the same manner as Example X1.

When the water permeation volume of the hollow fiber membrane module was measured, using:

water as the hyposmotic solution and an aqueous solution of Polyethylene Glycol 200 (product of Tokyo Kasei Kogyo Co., Ltd.) at a concentration of 15 mass % as the hyperosmotic solution, it was found to be 5.6 kg/(m²×hr).

The measured forward osmosis hollow fiber module was used for an additional 9 repeated measurements (total of 10). At the 10th measurement, the water permeation volume was 5.6 kg/(m²×hr), and no polyethylene glycol was detected from the solution on the core side (purified water) after the 10th measurement.

The diameter of the polyketone hollow fiber membrane, measured upon disassembling the module, was 1,080 μm, the thickness of the membrane section was 150 μm, and the thickness of the polyamide thin membrane layer was 0.3 μm, Direct visual observation revealed no particular change in the state of the support layer.

Comparative Example Y4

Repeated testing was conducted in the same manner as Example Y4, except that a module fabricated in the same manner as Comparative Example X1 was used as the forward osmosis hollow fiber membrane module for Example Y4.

The evaluation results are shown in Table 7.

TABLE 7

| | Test solution | | Water permeation volume (kg/(m² × h)) | | Poly- ethylene glycol leakage | Dimensions of hollow fiber membrane sections (μm) | | |
|---|---|---|---|---|---|---|---|---|
| Module | Hyposmotic solution | Hyperosmotic solution | 1st time | 10th time | | Diameter | Thickness of membrane section (μm) | Thickness of thin membrane layer (μm) |
| Example Y4 | Same as Example X1 | Test solution A (purified water) | 15 wt % polyethylene glycol aqueous solution | 5.6 | 5.6 | Absent | 1080 | 150 | 0.3 |
| Comp. Example Y4 | Same as Comp. Example X1 | Test solution A (purified water) | 15 wt % polyethylene glycol aqueous solution | 2.2 | 4.0 | Present | 1000 | 230 | 0.3 |

The results in Table 7 confirmed that a forward osmosis membrane system of the invention having a polyketone porous membrane as the support layer can stably exhibit high water permeability over a prolonged period and can maintain a low level of back diffusion of dissolved components from a hyperosmotic solution, even when the hyperosmotic solution contains an organic compound (polyethylene glycol) that can permeate the support layer.

In Comparative Example Y4, on the other hand, the polyether sulfone support layer was impaired by the polyethylene glycol, and the performance tended to decrease with prolonged use.

The embodiments of the invention described above are not intended to place limitations on the invention, and various modifications may be incorporated such as fall within the gist of the invention.

INDUSTRIAL APPLICABILITY

The forward osmosis treatment system of the invention has excellent permeability for water and sufficient durability against organic compounds, and it can therefore be suitably used, for example, in desalination of seawater, desalting of salt water, waste water treatment, concentration of valuable substances, treatment of accessory water used in oil/gas excavation, electric power generation utilizing two solutions with different osmotic pressures, and dilution of saccharides, fertilizers or refrigerants.

EXPLANATION OF SYMBOLS

1 Hollow fiber membrane module for forward osmosis membrane treatment
2 Tubular case
3 Shell side conduit
4 Shell side conduit
5 Forward osmosis hollow fiber membrane bundle
5a Forward osmosis hollow fiber membrane
6 Adhesive-anchored section
7 Adhesive-anchored section
8 Header
9 Header
10 Core side conduit
11 Core side conduit
12 Annular orifice
13 Circular orifice
14 Double tube
100 Forward osmosis treatment system
101 Supply tube
102 Circulation tube
103 Supply tube
104 Circulation tube
110 Hyperosmotic feeder
111 Hyposmotic feeder
A1 First region
A2 Second region

What is claimed is:

1. A forward osmosis membrane comprising a thin membrane layer exhibiting semi-permeable membrane performance laminated on a polyketone support layer,
   wherein the thin membrane layer is a polyamide thin membrane layer,
   wherein the polyketone support layer includes a polyketone which is a copolymer of carbon monoxide and one or more olefins, and a proportion of oxotrimethylene repeating units among repeating units of the polyketone is 70 mol % or greater,
   the polyketone support layer has pores with a maximum pore size of 50 nm or greater and no greater than 2 μm as measured by the bubble point method,
   the porosity of the polyketone support layer is 70% or greater, and
   the polyketone support layer is a flat membrane polyketone support layer having a thickness of no greater than 200 μm or a hollow fiber polyketone support layer having a thickness of 10 to 200 μm.

2. A forward osmosis membrane according to claim 1, wherein the thickness of the polyamide thin membrane layer is 0.05 to 2 μm.

3. A forward osmosis membrane according to claim 2, wherein the polyamide thin membrane layer is bonded to the polyketone support layer.

4. A forward osmosis membrane according to claim 3, wherein the polyamide thin membrane layer is bonded to the polyketone support layer by interfacial polymerization.

5. A forward osmosis membrane according to claim 1, wherein the polyketone support layer has a flat form.

6. A forward osmosis membrane according to claim 1, wherein the polyketone support layer has a hollow fiber form.

7. A forward osmosis membrane according to claim 6, wherein the thin membrane layer exhibiting semi-permeable membrane performance is laminated on either the outer side surface or inner side surface of the hollow fiber polyketone support layer.

8. A forward osmosis membrane according to claim 6, wherein the hollow fiber polyketone support layer has an outer diameter of 100 to 3,000 µm.

9. A forward osmosis hollow fiber membrane module, which has a structure in which a fiber bundle comprising a plurality of forward osmosis membranes according to claim 6 is housed in a tubular case, and both ends of the fiber bundle are anchored to the tubular case by adhesively anchored sections.

10. A forward osmosis treatment system comprising:
a semi-permeable membrane unit made of a forward osmosis membrane according to claim 1,
a first region and a second region partitioned by the forward osmosis membrane within the semi-permeable membrane unit,
a hyposmotic solution feeder that feeds a hyposmotic solution to the first region, and
a hyperosmotic solution feeder that feeds a hyperosmotic solution to the second region,
and having a function of producing fluid movement from the first region to which the hyposmotic solution has been fed to the second region to which the hyperosmotic solution has been fed, through the semi-permeable membrane unit.

11. A forward osmosis treatment system according to claim 10, wherein either or both the hyposmotic solution and the hyperosmotic solution include an organic compound.

12. A water production method wherein a forward osmosis treatment system according to claim 10 is used to cause water to migrate from a hyposmotic solution to a hyperosmotic solution, and then the water is recovered from the hyperosmotic solution.

13. A method of concentrating a water-containing substance, wherein a forward osmosis treatment system according to claim 10 is used to remove water from a water-containing substance.

14. A method of diluting a solution, wherein a forward osmosis treatment system according to claim 10 is used to dilute a hyperosmotic solution by water migrating from a hyposmotic solution to the hyperosmotic solution.

15. An electric power generation method, wherein a forward osmosis treatment system according to claim 10 is used to cause water to migrate from a hyposmotic solution to a hyperosmotic solution to increase the flow rate of the hyperosmotic solution, and the increased flow rate drives a water flow electric generator to generate electricity.

* * * * *